US012198610B2

(12) United States Patent
Zhang

(10) Patent No.: US 12,198,610 B2
(45) Date of Patent: Jan. 14, 2025

(54) DISPLAY PANEL, DISPLAY APPARATUS AND METHOD FOR DRIVING DISPLAY PANEL

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 110 days.

(21) Appl. No.: 18/119,786

(22) Filed: Mar. 9, 2023

(65) Prior Publication Data

US 2024/0144859 A1 May 2, 2024

(30) Foreign Application Priority Data

Oct. 26, 2022 (CN) ........................ 202211317090.8

(51) Int. Cl.
*G09G 3/32* (2016.01)

(52) U.S. Cl.
CPC ....... *G09G 3/32* (2013.01); *G09G 2310/0275* (2013.01); *G09G 2320/0247* (2013.01)

(58) Field of Classification Search
CPC ............. G09G 3/32; G09G 2310/0275; G09G 2320/0247; G09G 2300/0819;
(Continued)

(56) References Cited

U.S. PATENT DOCUMENTS 11,361,713 B1 * 6/2022 Fu ........................ G09G 3/3241
11,749,196 B1 * 9/2023 Kim ........................ G09G 3/32
345/211
(Continued)

FOREIGN PATENT DOCUMENTS

CN 101520986 A 9/2009
CN 107452334 A 12/2017
(Continued)

OTHER PUBLICATIONS

The First Office Action for CN Application No. 202211317090.8, dated May 16, 2024, 20 pages.

*Primary Examiner* — William Lu
(74) *Attorney, Agent, or Firm* — East IP P.C.

(57) ABSTRACT

The present application discloses a display panel, a display apparatus and a method for driving the display panel. The display panel includes a pixel circuit and a light-emitting element; the pixel circuit includes a data writing module and a driving module including a driving transistor; in a duration of an image frame of the display panel, an operation process of the pixel circuit includes a pre-light emission stage and a light emission stage; in a duration of at least one image frame, the pre-light emission stage of the pixel circuit includes a data writing stage and n1 bias stages, $n1 \geq 1$, and n1 is an integer; the data writing module is configured to provide a data signal to a gate of the driving transistor in the data writing stage and to provide a bias signal to the driving transistor in the bias stages.

18 Claims, 18 Drawing Sheets

(58) Field of Classification Search
CPC ... G09G 2300/0842; G09G 2300/0861; G09G 2310/0251; G09G 2310/0262; G09G 2310/08; G09G 2320/0257; G09G 2340/0435; G09G 3/3233; G09G 3/30
See application file for complete search history.

(56) References Cited

U.S. PATENT DOCUMENTS

| | | | | |
|---|---|---|---|---|
| 12,112,693 | B1 * | 10/2024 | Sang | G09G 3/3266 |
| 2006/0244391 | A1 * | 11/2006 | Shishido | G09G 3/3258 315/169.3 |
| 2007/0152915 | A1 * | 7/2007 | Lee | G09G 3/296 345/67 |
| 2009/0322730 | A1 * | 12/2009 | Yamamoto | G09G 3/3258 345/213 |
| 2014/0160185 | A1 * | 6/2014 | Okuno | G09G 3/3233 345/691 |
| 2014/0347401 | A1 * | 11/2014 | Hwang | G09G 3/3233 345/82 |
| 2015/0054722 | A1 * | 2/2015 | Kanda | G09G 3/3233 345/77 |
| 2015/0108437 | A1 * | 4/2015 | Cho | G09G 3/3233 257/40 |
| 2015/0130691 | A1 * | 5/2015 | Jeon | G09G 3/3225 345/82 |
| 2015/0279279 | A1 * | 10/2015 | Toyomura | G09G 3/3266 345/212 |
| 2015/0348472 | A1 * | 12/2015 | Chan | G09G 3/3466 345/205 |
| 2016/0210898 | A1 * | 7/2016 | Tsuge | G09G 3/3233 |
| 2017/0124941 | A1 * | 5/2017 | Na | G09G 3/2092 |
| 2017/0124954 | A1 * | 5/2017 | Park | G09G 3/3258 |
| 2019/0347997 | A1 * | 11/2019 | Park | G11C 19/28 |
| 2020/0051472 | A1 * | 2/2020 | Ju | H10K 71/70 |
| 2020/0349879 | A1 * | 11/2020 | Park | G09G 3/3266 |
| 2021/0104196 | A1 * | 4/2021 | Yuan | G09G 3/3258 |
| 2021/0118368 | A1 * | 4/2021 | In | G09G 3/3275 |
| 2021/0125543 | A1 | 4/2021 | Kim et al. | |
| 2021/0201759 | A1 * | 7/2021 | Cho | G09G 3/3233 |
| 2021/0248960 | A1 * | 8/2021 | Lee | G09G 3/3275 |
| 2021/0280132 | A1 * | 9/2021 | Gao | G09G 3/3233 |
| 2021/0287614 | A1 * | 9/2021 | Xiong | G09G 3/3233 |
| 2021/0327368 | A1 * | 10/2021 | Park | G09G 3/3275 |
| 2021/0366397 | A1 * | 11/2021 | Na | H10K 59/1213 |
| 2022/0108665 | A1 * | 4/2022 | Ozaki | G09G 3/3413 |
| 2022/0173189 | A1 * | 6/2022 | Kim | H10K 59/1213 |
| 2023/0144298 | A1 * | 5/2023 | Koo | G09G 3/3291 345/204 |
| 2023/0186845 | A1 * | 6/2023 | Liu | H10K 59/131 345/76 |
| 2023/0215359 | A1 * | 7/2023 | Lee | G09G 3/2007 345/690 |
| 2023/0377508 | A1 * | 11/2023 | Zhou | H10K 59/131 |

FOREIGN PATENT DOCUMENTS

| | | | |
|---|---|---|---|
| CN | 108538243 | A | 9/2018 |
| CN | 110010072 | A | 7/2019 |
| CN | 110738965 | A | 1/2020 |
| CN | 111383596 | A | 7/2020 |
| CN | 111435587 | A | 7/2020 |
| CN | 111883055 | A | 11/2020 |
| CN | 112133242 | A | 12/2020 |
| CN | 112150967 | A | 12/2020 |
| CN | 113707064 | A | 11/2021 |
| CN | 114420032 | A | 4/2022 |
| CN | 114898701 | A | 8/2022 |
| KR | 20170083661 | A | 7/2017 |
| KR | 20210055146 | A | 5/2021 |
| KR | 20220094952 | A | 7/2022 |

* cited by examiner

DISPLAY PANEL, DISPLAY APPARATUS AND METHOD FOR DRIVING DISPLAY PANEL

CROSS-REFERENCE TO RELATED APPLICATION

This application claims priority to Chinese Patent Application No. 202211317090.8, filed on Oct. 26, 2022, which is incorporated herein by reference in its entirety.

TECHNICAL FIELD

The present application relates to the field of display technology, and particularly, to a display panel, a display apparatus and a method for driving the display panel.

BACKGROUND

Pixel circuits and light-emitting elements are usually disposed in a display panel, and the driving transistors in the pixel circuits can provide a drive current for the light-emitting elements according to the received data signal to drive the light-emitting elements to emit light, so that the display panel presents a display image with corresponding brightness.

Nonetheless, in low-frequency display, a serious smear problem exists when the image is switched, and the display effect is affected.

SUMMARY

Embodiments of the present application provide a display panel, a display apparatus and a method for driving the display panel.

In a first aspect, embodiments of the present application provide a display panel including: a pixel circuit and a light-emitting element; the pixel circuit including a data writing module and a driving module including a driving transistor; in a duration of an image frame of the display panel, an operation process of the pixel circuit including a pre-light emission stage and a light emission stage; in a duration of at least one image frame, the pre-light emission stage of the pixel circuit including a data writing stage and n1 bias stages, n1≥1, and n1 being an integer; the data writing module being configured to provide a data signal to a gate of the driving transistor in the data writing stage and to provide a bias signal to the driving transistor in the bias stages; and the n1 bias stages including a first bias stage before the data writing stage, and the bias signal being written into the gate of the driving transistor in the first bias stage.

In a second aspect, based on the same inventive concept, embodiments of the present application provide a method for driving a display panel, the display panel including a pixel circuit and a light-emitting element; the pixel circuit including a data writing module and a driving module including a driving transistor; in a duration of an image frame of the display panel, an operation process of the pixel circuit including a pre-light emission stage and a light emission stage, and in a duration of at least one image frame, the pre-light emission stage of the pixel circuit including a data writing stage and n1 bias stages, n1≥1, and n1 being an integer; wherein the method comprises: providing, by the data writing module, a data signal to a gate of the driving transistor in the data writing stage; and providing, by the data writing module, a bias signal to the driving transistor in the bias stages, the n1 bias stages including a first bias stage before the data writing stage, the bias signal being written into the gate of the driving transistor in the first bias stage.

In a third aspect, based on the same inventive concept, the embodiments of the present application provides a display apparatus including the display panel according to the embodiments of the first aspect, the display panel including: a pixel circuit and a light-emitting element; the pixel circuit including a data writing module and a driving module including a driving transistor; in a duration of an image frame of the display panel, an operation process of the pixel circuit including a pre-light emission stage and a light emission stage; in a duration of at least one image frame, the pre-light emission stage of the pixel circuit including a data writing stage and n1 bias stages, n1≥1, and n1 being an integer; the data writing module being configured to provide a data signal to a gate of the driving transistor in the data writing stage and to provide a bias signal to the driving transistor in the bias stages; and the n1 bias stages including a first bias stage before the data writing stage, and the bias signal being written into the gate of the driving transistor in the first bias stage.

BRIEF DESCRIPTION OF THE DRAWINGS

Other features, objects and advantages of the present application will become more apparent from the following detailed description of the non-limiting embodiments with reference to the drawings, in which the same or similar reference signs refer to the same or similar features, and the drawings are not drawn according to actual scale.

DETAILED DESCRIPTION

Figure 1:
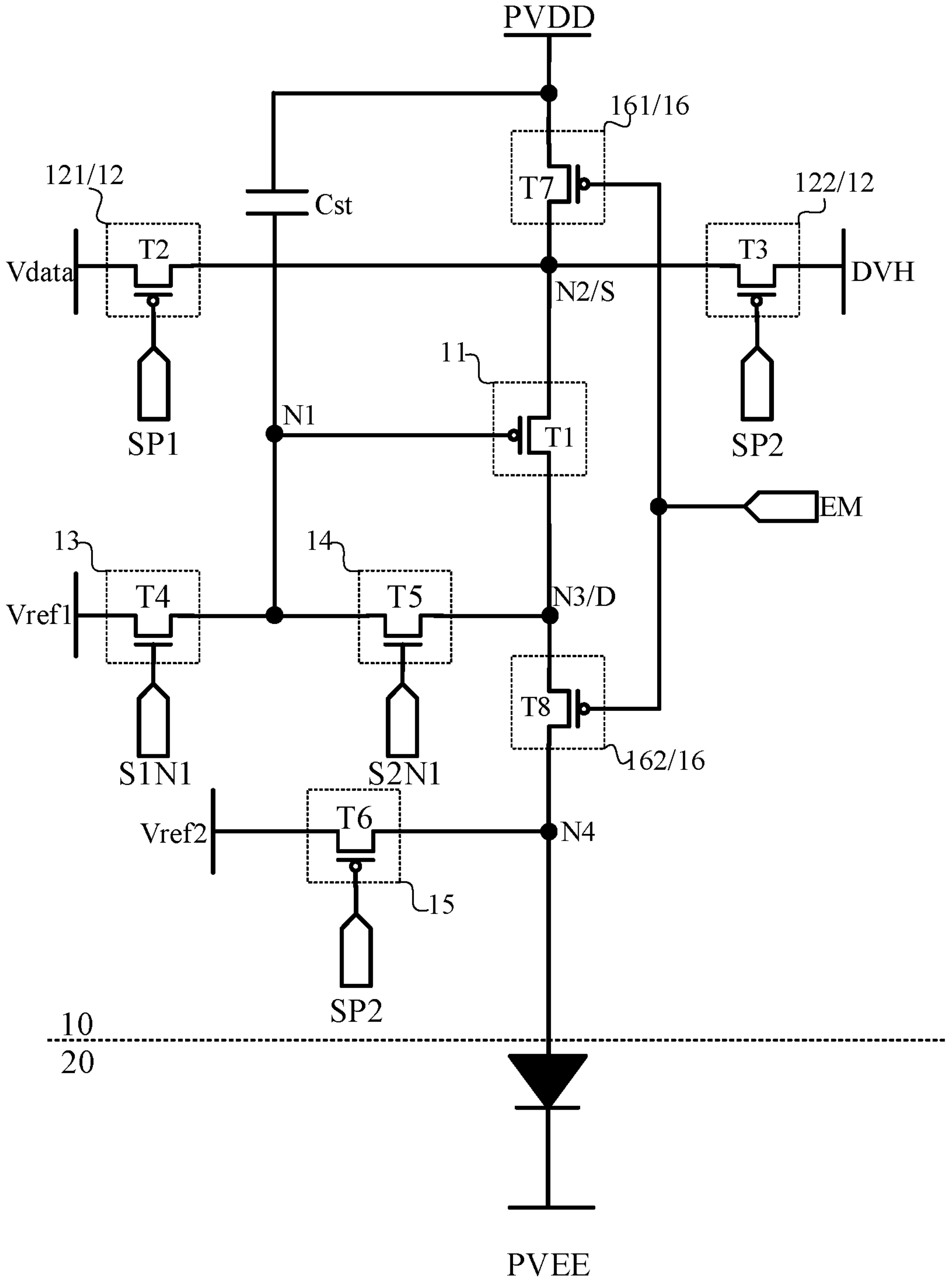
FIG. 1 shows a schematic structural diagram of a pixel circuit of a display panel according to embodiments of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that the specific embodiments described herein are merely configured to illustrate the present application, rather than to limit the present application. For those skilled in the art, the present application can be implemented without some of these specific details. The following description of the embodiments is only for providing a better understanding of the present application by illustrating examples of the present application.

It should be noted that relational terms such as "first" and "second" are used herein only for distinguishing one entity or operation from another entity or operation, and do not necessarily require or imply any such actual relationship or order between these entities or operations. Moreover, the terms "comprising", "including" or any other variation thereof are intended to encompass a non-exclusive inclusion, such that a process, a method, an article or a device including a series of elements not only includes these elements, but also includes other elements not explicitly listed or elements inherent to the process, the method, the article or the device. Without further limitation, an element preceded by "comprising . . . " and "including . . . " does not exclude the presence of additional similar elements in a process, a method, an article or a device including the element.

It should be noted that when the structure of a component is described, a layer/region being referred as "above" or "over" another layer/region means that the layer/region is directly above the other layer/region or other layers or regions are further included between the layer/region and the other layer/region. Moreover, if the component is turned over, the layer/region will be "under" or "below" the other layer/region.

It should be understood that the term "and/or" as used herein only refers to an association relationship for describing the associated objects, which may include three possible relationships. For example, "A and/or B" may represent: A alone, both A and B, and B alone. In addition, the character "/" herein generally represents an "or" relationship between the associated objects.

In the embodiments of the present application, the term "electrically connected" may indicate that two components are directly electrically connected, or that the two components are electrically connected via one or more other components.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application may be combined with one another if there is no conflict.

Before the technical solutions provided by the embodiments of the present application are described, the problems in the art are first described in the present application to facilitate the understanding of the embodiments of the present application.

As described in the BACKGROUND, in low-frequency display, a serious smear problem exists when the image is switched, and the display effect is affected.

In order to solve the above technical problems, the inventors of the present application first studied and analyzed the root causes for the above technical problems, and the specific study and analysis process is as follows: when the display panel displays two different images, due to a difference in image brightness, when the images are switched, for example, when a black image is switched to a white image and vice versa, the image brightness changes slowly, that is, the brightness cannot reach the target brightness in the initial time period, which causes that the brightness of the first frame is low and it takes a long time for the brightness to change, which is conspicuous to human eyes, resulting in the smear problem in the image and poor image display effect.

For the above problems, the present application provides a display panel, a display apparatus and a method for driving the display panel, which are beneficial for mitigating the smear phenomenon and improving the display effect.

A display panel according to the embodiments of the present application is first described below.

FIG. 1 shows a schematic structural diagram of a pixel circuit of a display panel according to embodiments of the present application. As shown in FIG. 1, the display panel may include a pixel circuit 10 and a light-emitting element 20. The pixel circuit 10 may include a driving module 11 and a data writing module 12. The driving module 11 is configured to provide a drive current for the light-emitting element 20 and may include a driving transistor T1. The light-emitting element 20 includes, but is not limited to, an organic light-emitting diode (OLED).

The data writing module 12 may provide a data signal Vdata and a bias signal DVH to the driving transistor T1.

Figure 2:
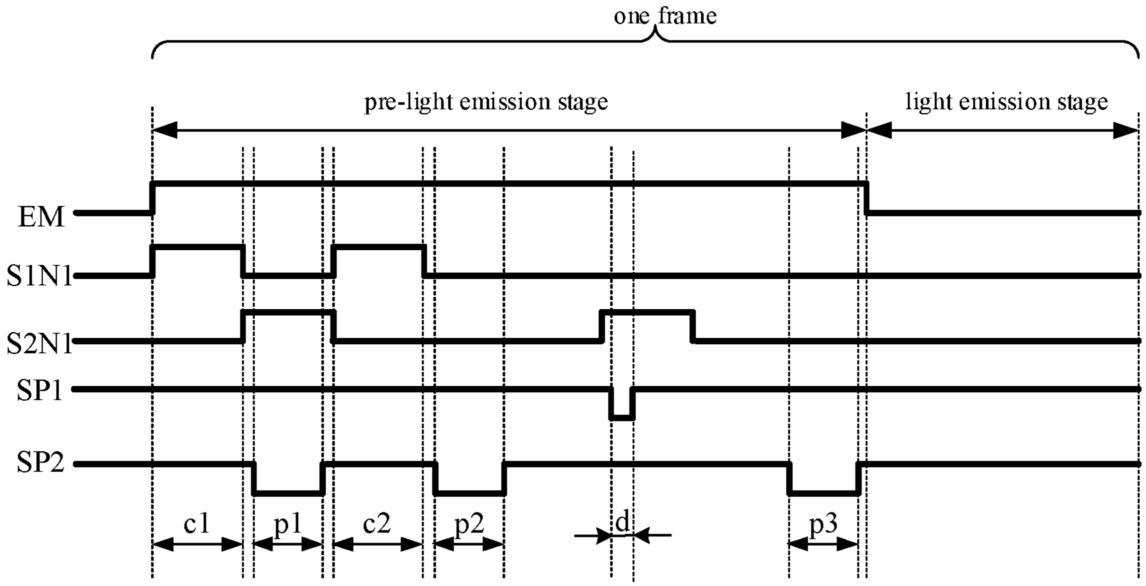
FIG. 2 shows a schematic diagram of a time sequence of the pixel circuit of FIG. 1.
Figure 3:
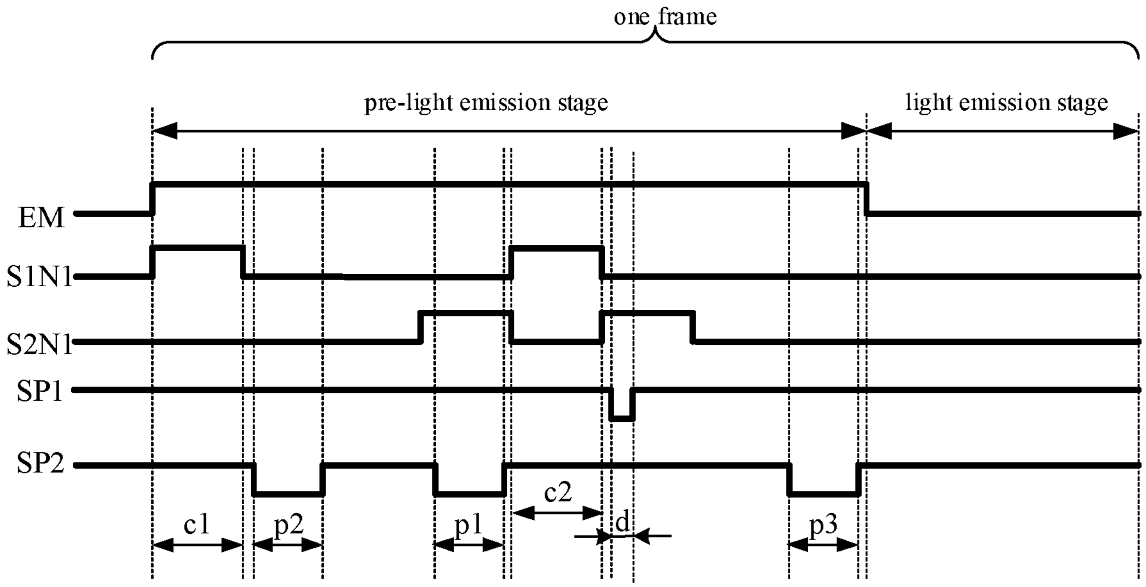
FIG. 3 shows another schematic diagram of a time sequence of the pixel circuit of FIG. 1.

As shown in FIG. 2 or FIG. 3, in a duration of an image frame of the display panel, an operation process of the pixel circuit may include a pre-light emission stage and a light emission stage. In a duration of at least one image frame, the pre-light emission stage of the pixel circuit may include a data writing stage d and n1 bias stages, $n1 \geq 1$, and n1 is an integer. In FIG. 2 and FIG. 3, for example, $n1=3$, and for convenience of distinguishing, the bias stages are labeled as p1, p2 and p3, respectively. The number of the bias stages as shown in FIG. 2 and FIG. 3 is not intended to limit the present application.

The data writing module 12 may be configured to provide the data signal Vdata to a gate of the driving transistor T1 in the data writing stage d and to provide the bias signal DVH to the driving transistor T1 in the various bias stages. The driving transistor T1 may generate a corresponding drive current according to the data signal Vdata to drive the light-emitting element 20 to emit light. In the bias stages, the bias signal DVH may be configured to adjust the bias voltage condition of the driving transistor T1.

The n1 bias stages may include at least one first bias stage p1 before the data writing stage d. The bias signal DVH is written into the gate of the driving transistor T1 in the first bias stage p1. It may be understood that the first bias stage p1 does not overlap the data writing stage d in terms of time.

In the embodiments of the present application, since the first bias stage is before the data writing stage, the writing of the bias signal into the gate of the driving transistor may modify the characteristics of the driving transistor in advance, and a unified writing of the bias signal is performed for the characteristics of the driving transistors of various pixel circuits before the data signal of the current image is written, so as to ensure that the characteristics of the driving transistors of various pixel circuits are more close before the data signal is written, and thus to eliminate the influence of bias voltage of a previous image on the driving transistors, mitigate the smear problem when the displayed image is switched and improve the display effect.

As an example, as shown in any one of FIGS. 1 and 4-6, the data writing module 12 may include a first sub-module 121 and a second sub-module 122. The first sub-module 121 may be electrically connected to a data signal terminal which is configured to provide the data signal Vdata. The first sub-module 121 may be configured to transmit, under control of a first control signal SP1, the data signal Vdata to the driving transistor T1. The second sub-module 122 may be electrically connected to a bias signal terminal which is configured to provide the bias signal DVH. The second sub-module 122 may be configured to transmit, under control of a second control signal SP2, the bias signal DVH to the driving transistor T1.

The first sub-module 121 may include a second transistor T2, the gate of the second transistor T2 receives the first control signal SP1, the first terminal of the second transistor T2 receives the data signal Vdata, and the second terminal of the second transistor T2 is electrically connected to the first terminal or the second terminal of the driving transistor T1.

The second sub-module 122 may include a third transistor T3, the gate of the third transistor T3 receives the second control signal SP2, the first terminal of the third transistor T3 receives the bias signal DVH, and the second terminal of the third transistor T3 is electrically connected to the first terminal or the second terminal of the driving transistor T1.

The first control signal SP1 and the second control signal SP2 may be pulse signals, and the second transistor T2 and the third transistor T3 are controlled to be turned on or turned off through the high levels and the low levels of the pulse signals.

Figure 7:
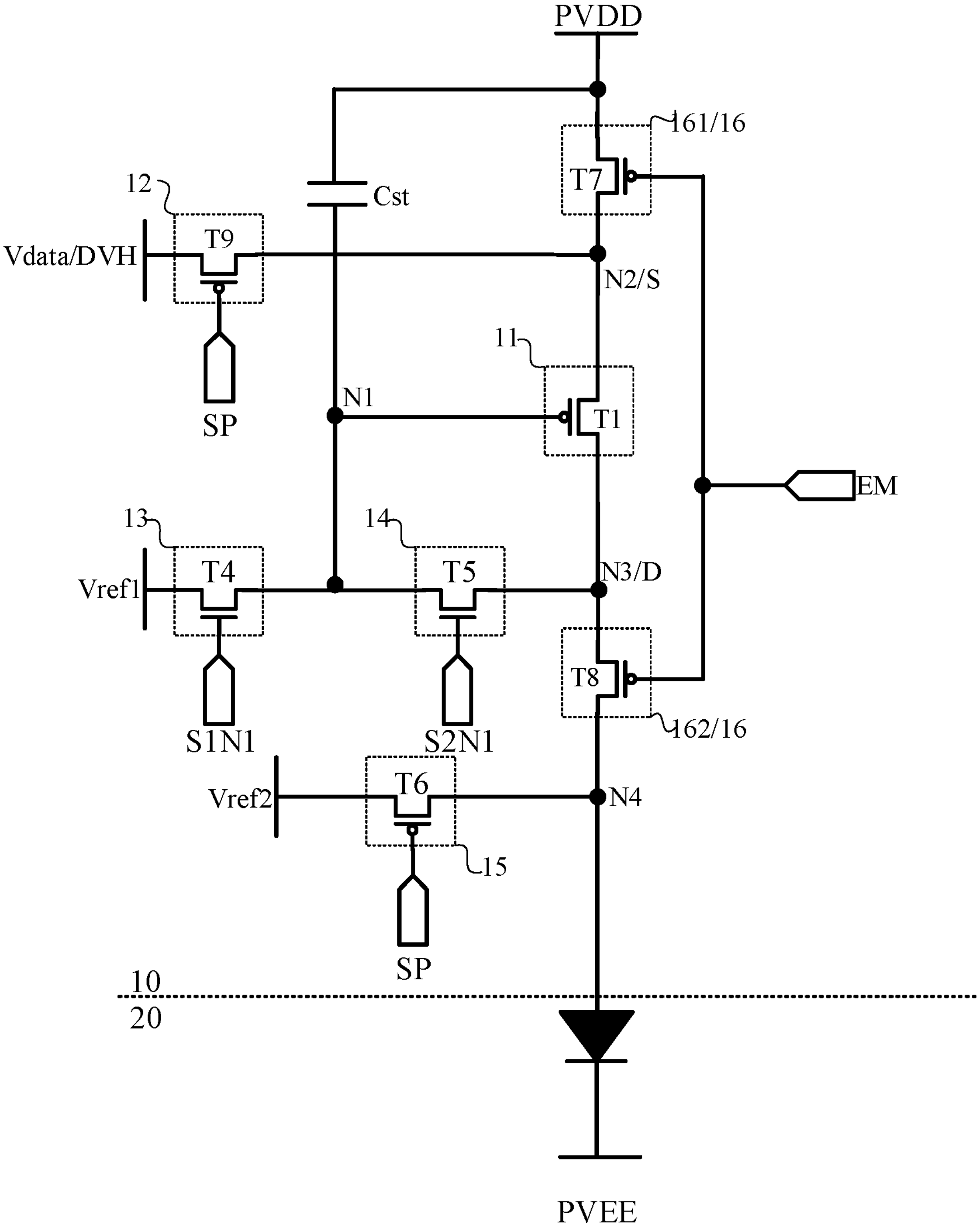
FIG. 7 shows another schematic structural diagram of a pixel circuit of a display panel according to embodiments of the present application.

As another example, the data signal Vdata and the bias signal DVH may be transmitted by a same transistor in a time-sharing manner. As shown in FIG. 7, the data writing module 12 may include a transistor T9, the first terminal of the transistor T9 may be electrically connected to the data signal terminal which may provide the data signal Vdata and the bias signal DVH in the time-sharing manner, and the second terminal of the transistor T9 may be electrically connected to the source of the driving transistor T1. In other examples, the second terminal of the transistor T9 may be electrically connected to the drain of the driving transistor T1. The gate of the transistor T9 may receive a control signal SP. The control signal SP may be a pulse signal, and the transistor T9 is controlled to be turned on or turned off through the high levels and the low levels of the pulse signal.

Figure 8:
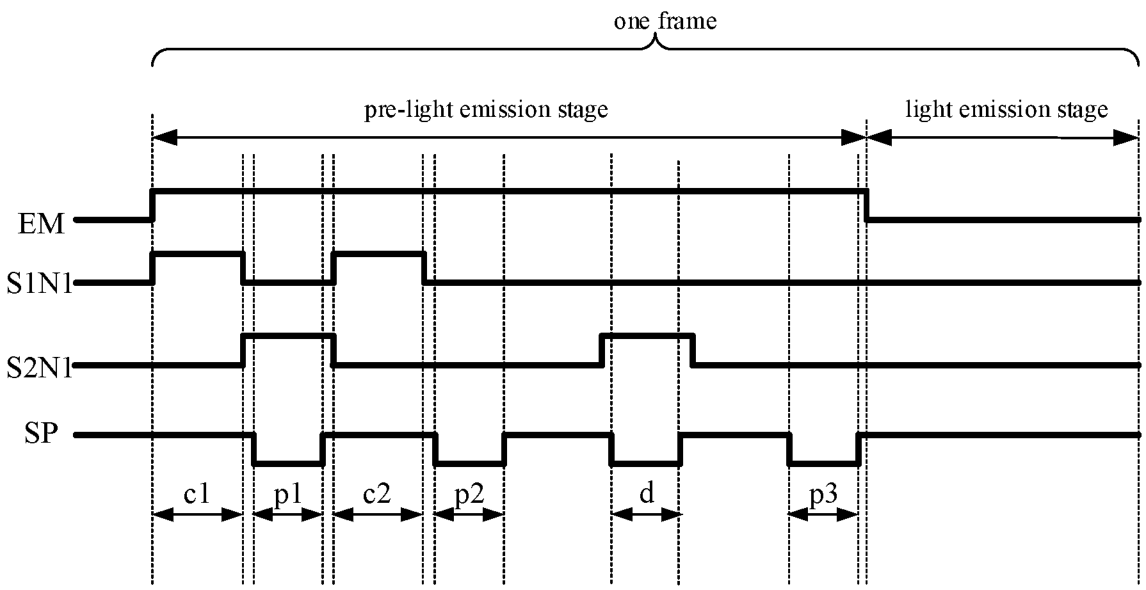
FIG. 8 shows a schematic diagram of a time sequence of the pixel circuit of FIG. 7.
Figure 9:
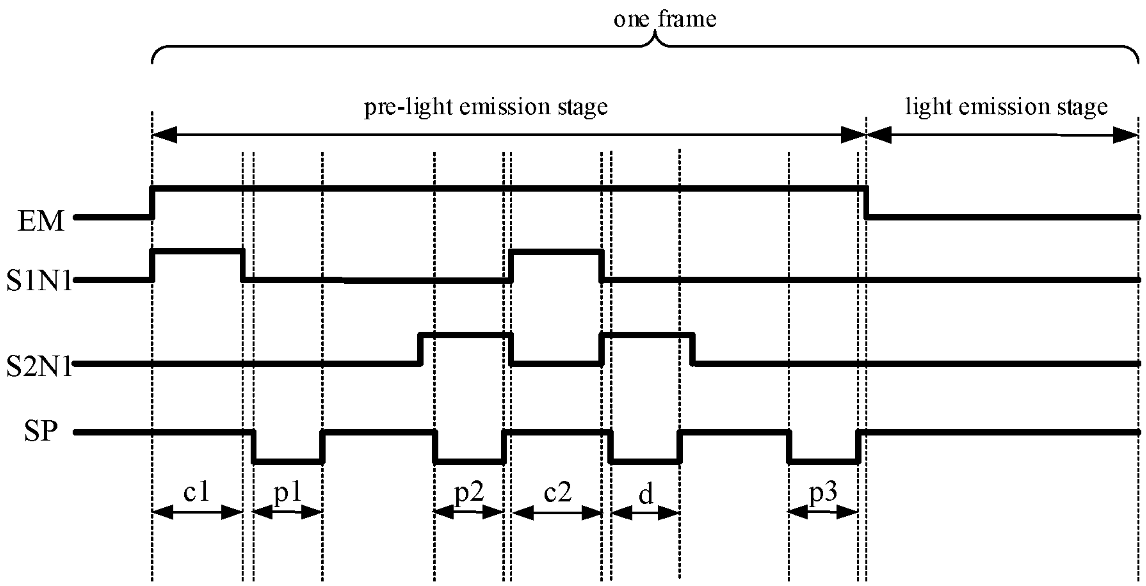
FIG. 9 shows another schematic diagram of a time sequence of the pixel circuit of FIG. 7.

As shown in FIG. 8 or FIG. 9, under a condition that the data signal Vdata and the bias signal DVH are transmitted by the transistor T9 in the time-sharing manner, in the n1 bias stages, the transistor T9 is turned on to transmit the bias signal DVH to the driving transistor T1, and in the data writing stage d, the transistor T9 is turned on to transmit the data signal Vdata to the driving transistor T1.

It should be noted that if the first terminal of the driving transistor T1 is the source S, the second terminal of the driving transistor T1 is the drain D, and if the second terminal of the driving transistor T1 is the source S, the first terminal of the driving transistor T1 is the drain D. It may be understood that the source and the drain of the transistor are not constant, but change as the driving state of the transistor changes.

Figure 4:
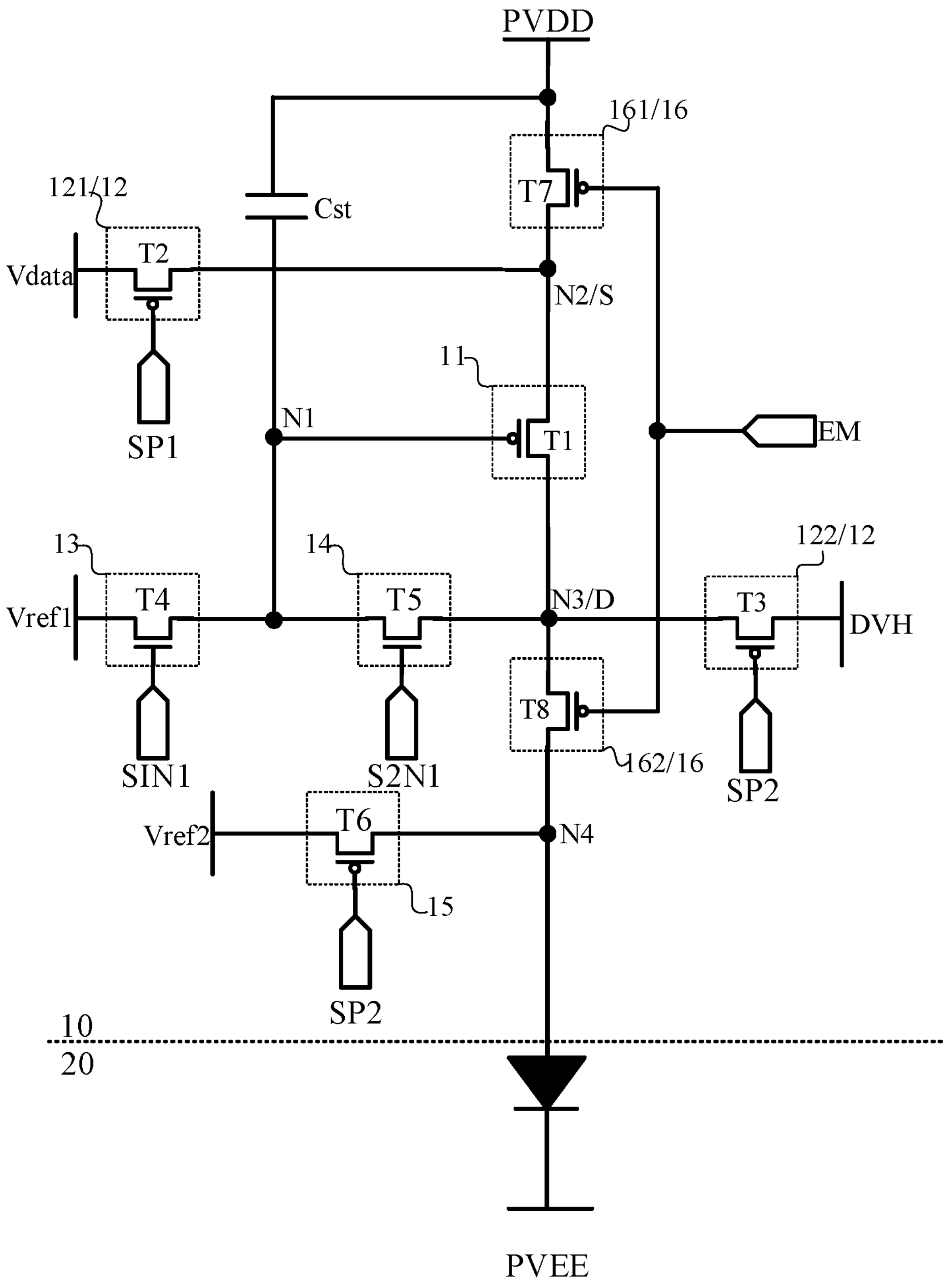
FIG. 4 shows a schematic structural diagram of a pixel circuit of a display panel according to embodiments of the present application.
Figure 5:
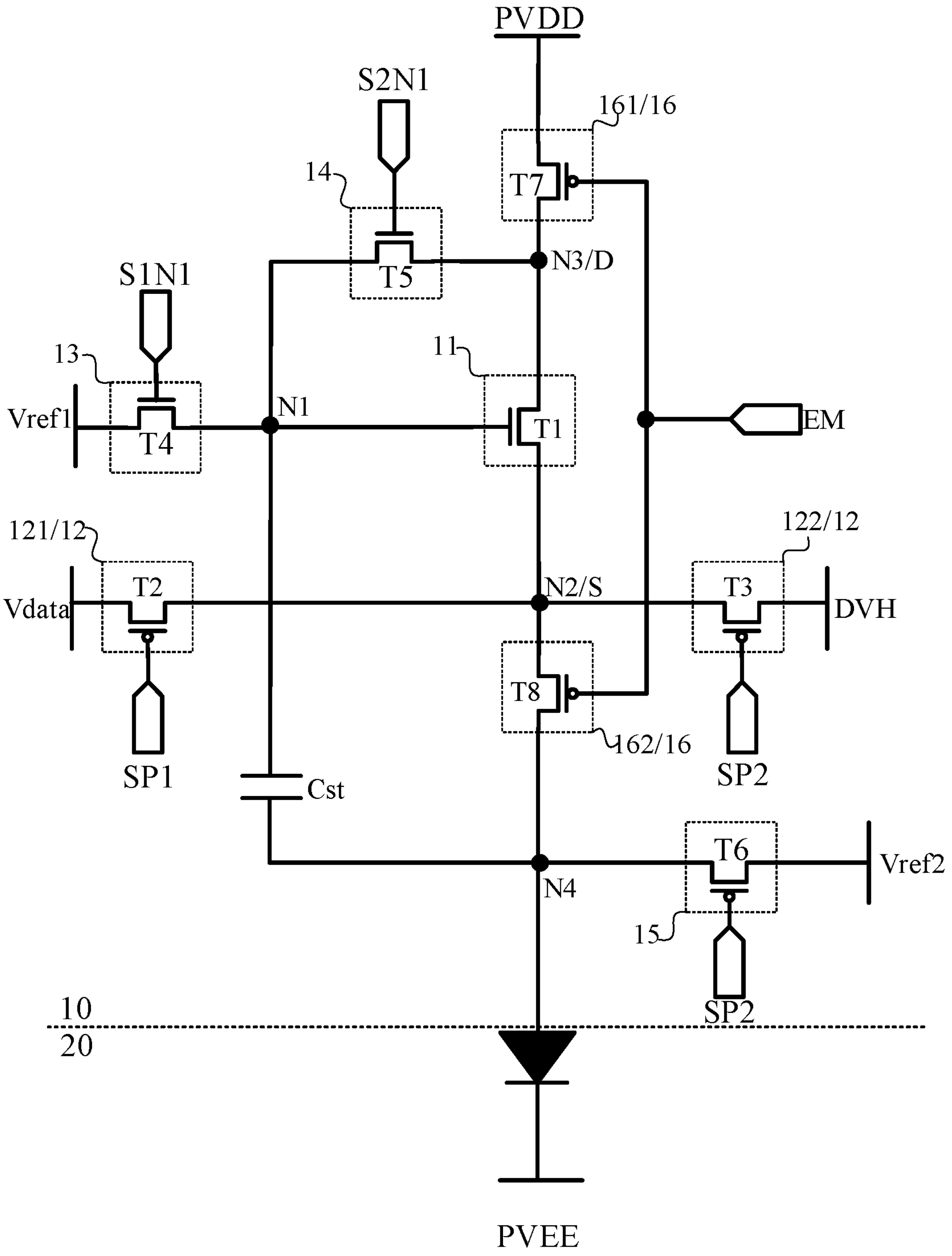
FIG. 5 shows a schematic structural diagram of a pixel circuit of a display panel according to embodiments of the present application.
Figure 6:
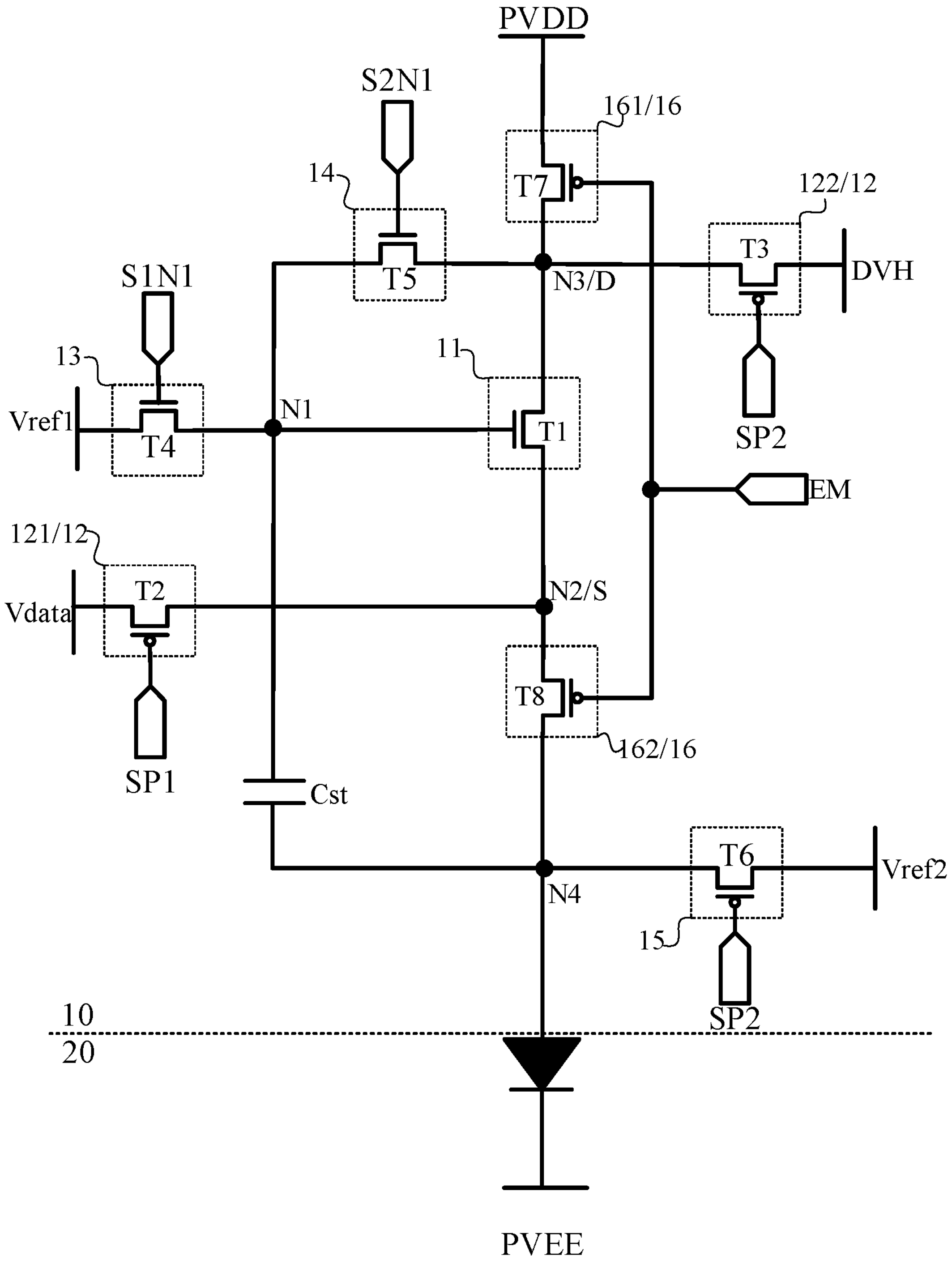
FIG. 6 shows a schematic structural diagram of a pixel circuit of a display panel according to embodiments of the present application.

FIG. 1, FIG. 4 and FIG. 7 exemplarily show that the driving transistor T1 of the pixel circuit 10 is a PMOS transistor, and in this case, the drain D of the driving transistor T1 is coupled to the light-emitting element 20, and the source S of the driving transistor T1 receives the data signal Vdata and transmits the received data signal Vdata to the gate of the driving transistor T1. The embodiments of the present application may be further as shown in FIG. 5 and FIG. 6, the driving transistor T1 of the pixel circuit 10 may be a NMOS transistor, and in this case, the source S of the driving transistor T1 receives the data signal Vdata and is further coupled to the light-emitting element 20.

In addition, in the drawings of the present application, for example, the gate of the driving transistor T1 is electrically connected to a node N1, the source S of the driving transistor T1 is electrically connected to a node N2, the drain D of the driving transistor T1 is electrically connected to a node N3, and the anode of the light-emitting element 20 is electrically connected to a node N4.

For convenience of description, without particular explanation, the technical solutions of the embodiments of the present application are exemplarily described with reference to the pixel circuit as shown in FIG. 1.

Exemplarily, under a condition that the data writing module 12 is electrically connected to the first terminal or the second terminal of the driving transistor T1, as shown in any one of FIGS. 1 and 4-7, the pixel circuit 10 may further include a compensation module 14 which is electrically connected between the gate of the driving transistor T1 and the first terminal or the second terminal of the driving transistor T1. The compensation module 14 may be turned on or turned off under control of a third control signal S2N1. The compensation module 14 may include a fifth transistor T5, the first terminal of the fifth transistor T5 is electrically connected to the gate of the driving transistor T1, the second terminal of the fifth transistor T5 is electrically connected to the first terminal or the second terminal of the driving transistor T1, and the gate of the fifth transistor T5 receives the third control signal S2N1. The third control signal S2N1 is a pulse signal, and the fifth transistor T5 is controlled to be turned on or turned off through the high levels and the low levels of the pulse signal.

It can be understood that, for example, in FIG. 1, in the data writing stage d, the third control signal S2N1 may control the fifth transistor T5 to be turned on, and in this stage, the second transistor T2 and the driving transistor T1 may also be turned on to ensure that the data signal Vdata is transmitted to the source S of the driving transistor T1 via the second transistor T2, then to the drain D of the driving transistor T1 via the driving transistor T1, and then to the gate of the driving transistor T1 via the fifth transistor T5. In addition, in the first bias stage p1, the third control signal S2N1 may control the fifth transistor T5 to be turned on, and in this stage, the third transistor T3 and the driving transistor T1 may also be turned on to ensure that the bias signal DVH is transmitted to the source S of the driving transistor T1 via the third transistor T3, then to the drain D of the driving transistor T1 via the driving transistor T1, and then to the gate of the driving transistor T1 via the fifth transistor T5.

In some optional embodiments, as shown in any one of FIGS. 1 and 4-7, the pixel circuit 10 may further include a first initialization module 13. As shown in FIG. 2 or FIG. 3, in a duration of at least one image frame, the pre-light emission stage of the pixel circuit further includes a first initialization stage c1 before any one of the bias stages. It can be understood that the first initialization stage c1 is before the first bias stage p1. The first initialization module 13 is configured to write a first initialization signal Vref1 into the gate of the driving transistor T1 in the first initialization stage c1.

The first initialization module 13 may be electrically connected between a first initialization signal terminal and the gate of the driving transistor T1 and may be turned on or turned off under control of a fourth control signal S1N1. The first initialization signal terminal is configured to provide the first initialization signal Vref1.

As an example, the first initialization module 13 may include a fourth transistor T4, the first terminal of the fourth transistor T4 receives the first initialization signal Vref1, the second terminal of the fourth transistor T4 is electrically connected to the gate of the driving transistor T1, and the gate of the fourth transistor T4 receives the fourth control signal S1N1. The fourth control signal S1N1 is a pulse signal, and the fourth transistor T4 is controlled to be turned on or turned off through the high levels and the low levels of the pulse signal.

Since the voltages of various driving transistors T1 in a previous image frame may be different, for example, one of two light-emitting elements corresponds to a white image in the previous image frame and the other of the two light-emitting elements corresponds to a black image in the previous image frame, if there is no first initialization stage c1 before the first bias stage p1, when the bias signal DVH is written into the gates of two driving transistors corresponding to the two light-emitting elements, the potentials of the gates of the two driving transistor are different, which causes that the writing processes for the bias signal DVH are different and therefore the bias voltage conditions of the two driving transistors are different, resulting in differences among different driving transistors. In the embodiments of the present application, the first initialization stage c1 is before the first bias stage p1, thereby the bias signal DVH may be written into the gates of the driving transistors after the gates of the driving transistors are initialized as a same potential, so that the various driving transistors are subject to a same writing process for the bias signal DVH to further eliminate the influence of bias voltage of the previous image on the driving transistors.

Inventors of the present application have found that in a non-bias stage of the pixel circuit such as the light emission stage, for the PMOS driving transistors, the potential of gate may be higher than the potential of drain, and for the NMOS driving transistors, the potential of gate may be lower than the potential of drain; if the above cases are maintained for a long time period, ions inside the driving transistor will be polarized and a built-in electric field is formed inside the driving transistor, which results in a continuous deviation of the threshold voltage of the driving transistor, therefore the drive current flowing into the light-emitting element is affected. For example, when the black image is switched to the white image, the display brightness increases slowly and tends to be stable after 4 to 5 frames of data refresh, and since the recovery time is long, human eyes may perceive image smear.

In some optional embodiments, under a condition that n1≥2, as shown in FIG. 2 or FIG. 3, the n1 bias stages may include a second bias stage p2 before the data writing stage d and after the first initialization stage c1, and the bias signal DVH is written into the first terminal and/or the second terminal of the driving transistor T1 in the second bias stage p2.

In the second bias stage p2, the compensation module 14 may be turned off.

It can be understood that if the driving transistor T1 is turned on in the second bias stage p2, the bias signal DVH may be written into the first terminal and the second terminal of the driving transistor T1; and if the driving transistor T1 is turned off in the second bias stage p2, the bias signal DVH may be written into the first terminal or the second terminal of the driving transistor T1. For example, the driving transistor T1 is turned off in the second bias stage p2, under a condition that the transistor T3 for transmitting the bias signal DVH is connected to the first terminal of the driving transistor T1, the bias signal DVH may be written into the first terminal of the driving transistor T1, and under a condition that the transistor T3 for transmitting the bias signal DVH is connected to the second terminal of the driving transistor T1, the bias signal DVH may be written into the second terminal of the driving transistor T1.

In the embodiments of the present application, since the bias signal DVH may be written into the first terminal and/or the second terminal of the driving transistor T1 in the second bias stage p2, the driving transistor T1 is in an On-bias (OBS) state to mitigate the potential difference between the gate of the driving transistor T1 and the first terminal or the second terminal the driving transistor T1, reduce the polarization degree of the ions inside the driving transistor T1 and adjust the threshold voltage Vth of the driving transistor T1, so as to further reduce the influence of bias voltage of the previous image on the driving transistor T1.

As an example, as shown in FIG. 2, the second bias stage p2 may be after the first bias stage p1.

In some optional embodiments, as shown in FIG. 2, in a duration of at least one image frame, the pre-light emission stage of the pixel circuit may further include a second initialization stage c2 between the first bias stage p1 and the second bias stage p2. The first initialization module 13 is further configured to write the first initialization signal Vref1 into the gate of the driving transistor T1 in the second initialization stage c2.

Herein, for the PMOS driving transistor, the first initialization signal Vref1 may be a negative voltage and the bias signal DVH may be a high voltage.

In the embodiments of the present application, on the one hand, the second initialization stage c2 is before the data writing stage d, and with the second initialization stage c2, the data signal Vdata can be effectively written into the gate of the driving transistor in the data writing stage d; on the other hand, referring to FIG. 1 and FIG. 2, the second initialization stage c2 is before the second bias stage p2, thereby the gate of the driving transistor T1 is initialized as a negative potential in the second initialization stage c2, and in the second bias stage p2, the gate of the driving transistor T1 maintains the negative potential and the first terminal and the second terminal of the driving transistor T1 are high potentials of the bias signal DVH, so that the potential differences between the gate of the driving transistor T1 and the first terminal and the second terminal of the driving transistor T1 are negative, therefore a negative OBS bias voltage is applied to the driving transistor T1 to further reduce the influence of bias voltage of the previous image on the driving transistor T1.

As an example, as shown in FIG. 3, the second bias stage p2 may be before the first bias stage p1.

It can be understood that the first initialization stage c1 is before the second bias stage p2. Similarly, referring to FIG. 1 and FIG. 3, the first initialization stage c1 is before the second bias stage p2, thereby the gate of the driving transistor T1 is initialized as a negative potential in the first initialization stage c1, and in the second bias stage p2, the gate of the driving transistor T1 maintains the negative potential and the first terminal and the second terminal of the driving transistor T1 are high potentials of the bias signal DVH, so that the potential differences between the gate of the driving transistor T1 and the first terminal and the second terminal of the driving transistor T1 are negative, therefore a negative OBS bias voltage is applied to the driving transistor T1 to reduce the influence of bias voltage of the previous image on the driving transistor T1.

It can be understood that, in the second bias stage p2, the potential of the gate of the driving transistor T1 is equal to the low potential of the first initialization signal Vref1, and the potentials of the first terminal and the second terminal of the driving transistor T1 are the high potentials of the bias signal DVH, therefore the bias voltage by which the OBS process is performed on the driving transistor T1 is great, the characteristics of the driving transistor T1 deviate towards a same direction, and then the potential of the gate of the driving transistor T1 moves to the potential corresponding to the target image, the brightness of the light-emitting elements changes and flicker occurs. With the first bias stage p1 being after the second bias stage p2, the high voltage of the bias signal DVH is written into the gate of the driving transistor T1 to perform a new round of writing action, so that the bias voltage state of the driving transistor T1 changes due to the writing of the bias signal DVH into the gate of the driving transistor T1, so as to reduce the strong bias voltage influence of the second bias stage p2 and mitigate the flicker.

In some optional embodiments, as shown in FIG. 3, in a duration of at least one image frame, the pre-light emission stage of the pixel circuit may further include a second initialization stage c2 between the first bias stage p1 and the data writing stage d. The first initialization module 13 is further configured to write the first initialization signal Vref1 into the gate of the driving transistor T1 in the second initialization stage c2.

Since the high voltage of the bias signal DVH is written into the gate of the driving transistor in the first bias stage p1, the second initialization stage c2 between the first bias stage p1 and the data writing stage d may ensure that the data signal Vdata can be effectively written into the gate of the driving transistor in the data writing stage d.

In some optional embodiments, under a condition that n1>3, as shown in FIG. 2 or FIG. 3, the n1 bias stages may further include a third bias stage p3 after the data writing stage d, and the bias signal DVH is written into the first terminal and/or the second terminal of the driving transistor T1 in the third bias stage p3.

In the embodiments of the present application, with the third bias stage p3, the OBS process may be performed on the driving transistor T1 again to reduce the influence of bias voltage of the previous image on the driving transistor T1.

In the third bias stage p3, the compensation module 14 may be turned off.

It can be understood that if the driving transistor T1 is turned on in the third bias stage p3, the bias signal DVH may be written into the first terminal and the second terminal of the driving transistor T1; and if the driving transistor T1 is turned off in the third bias stage p3, the bias signal DVH may be written into the first terminal or the second terminal of the driving transistor T1. For example, the driving transistor T1 is turned off in the third bias stage p3, under a condition that the transistor T3 for transmitting the bias signal DVH is connected to the first terminal of the driving transistor T1, the bias signal DVH may be written into the first terminal of the driving transistor T1, and under a condition that the transistor T3 for transmitting the bias signal DVH is connected to the second terminal of the driving transistor T1, the bias signal DVH may be written into the second terminal of the driving transistor T1.

As an example, a duration of the first bias stage p1 may be greater than a duration of at least one of the second bias stage p2 and the third bias stage p3.

As another example, a duration of the first bias stage p1 may be greater than or equal to a total duration of the second bias stage p2 and the third bias stage p3.

In both of the second bias stage p2 and the third bias stage p3, the bias signal is written into the first terminal and/or the second terminal of the driving transistor, and the bias voltage adjustment processes performed on the driving transistor in the second bias stage p2 and the third bias stage p3 may be considered as identical, but in the first bias stage p1, the bias signal is written into the gate of the driving transistor, which is different from the second bias stage p2 and the third bias stage p3. With the duration of the first bias stage p1 being properly longer, the driving transistor N1 may be compensated better to further eliminate the differences in the characteristics of the driving transistors.

Exemplarily, the duration of the second bias stage p2 may be equal to the duration of the third bias stage p3.

Under a condition that the duration of the first bias stage p1 is longer, the voltage of the bias signal DVH may remain the same in the first bias stage p1, the second bias stage p2 and the third bias stage p3.

As an example, the voltage of the bias signal DVH may vary in different bias stages. For example, a voltage of the bias signal DVH in the first bias stage p1 is V1, a voltage of the bias signal DVH in the second bias stage p2 is V2, and a voltage of the bias signal DVH in the third bias stage p3 is V3, and V1<V2, and/or V1<V3.

As another example, V2=V3, and V1<V2, V1<V3.

In both of the second bias stage p2 and the third bias stage p3, the OBS process is performed on the driving transistor, and under a condition that the voltage of the bias signal DVH is higher in the second bias stage p2 and the third bias stage p3, a higher bias voltage process may be performed on the driving transistor to further eliminate the differences in the characteristics of the driving transistors.

Exemplarily, under a condition that voltage of the bias signal DVH varies in different bias stages, all the durations of the n1 bias stages in the pre-light emission stage may be equal. For example, the duration of the first bias stage p1, the duration of the second bias stage p2 and the duration of the third bias stage p3 are equal.

Exemplarily, as shown in FIG. 1, the pixel circuit 10 may further include a second initialization module 15, a light-emitting control module 16 and a storage capacitor Cst.

The second initialization module 15 is configured to transmit a second initialization signal Vref2 to the anode of the light-emitting element 20. The second initialization module 15 may be turned on or turned off under control of the second control signal SP2. In FIG. 1, for example, the second initialization module 15 and the second sub-module 122 receive the same control signal, and in other embodiments, the second initialization module 15 may receive a different control signal from the second control signal SP2 of the second sub-module 122.

The second initialization module 15 may include a sixth transistor T6, the first terminal of the sixth transistor T6 receives the second initialization signal Vref2, the second terminal of the sixth transistor T6 is electrically connected to the anode of the light-emitting element 20, and the gate of the sixth transistor T6 receives the second control signal SP2.

The light-emitting control module 16 may include a first light-emitting control module 161 and a second light-emitting control module 162. The first light-emitting control module 161 may include a seventh transistor T7, the gate of the seventh transistor T7 may receive a fifth control signal EM, the first terminal of the seventh transistor T7 is electrically connected to a positive first power supply signal PVDD, and the second terminal of the seventh transistor T7 may be electrically connected to the first terminal of the driving transistor T1. The second light-emitting control module 162 may include an eighth transistor T8, the gate of the eighth transistor T8 may receive the fifth control signal EM, the first terminal of the eighth transistor T8 is electrically connected to the second terminal of the driving transistor T1, and the second terminal of the eighth transistor T8 may be electrically connected to the anode of the light-emitting element 20. The cathode of the light-emitting element 20 is electrically connected to a negative second power supply signal PVEE.

The fifth control signal EM may be a pulse signal, and the seventh transistor T7 and the eighth transistor T8 are controlled to be turned on or turned off through the high levels and the low levels of the pulse signal.

As shown in FIG. 1, one end of the storage capacitor Cst is electrically connected to the positive first power supply signal PVDD, and the other end of the storage capacitor Cst is electrically connected to the gate of the driving transistor T1 at a node N1. Alternatively, as shown in FIG. 5, one end of the storage capacitor Cst is electrically connected to the anode of the light-emitting element 20 at a node N4, and the other end of the storage capacitor Cst is electrically connected to the gate of the driving transistor T1 at the node N1. The storage capacitor Cst stores the voltage of the gate of the driving transistor T1 to ensure the accuracy of the voltage of the gate of the driving transistor T1.

It should be noted that the transistors in the embodiments of the present application may be NMOS transistors or PMOS transistors. For the NMOS transistor, the ON-level is the high level, and the OFF-level is the low level. That is, if the gate of the NMOS transistor is at the high level, the first terminal and the second terminal of the NMOS transistor are turned on, and if the gate of the NMOS transistor is at the low level, the first terminal and the second terminal of the NMOS transistor are turned off. For the PMOS transistor, the ON-level is the low level, and the OFF-level is the high level. That is, if the control terminal of the PMOS transistor is at the low level, the first terminal and the second terminal of the PMOS transistor are turned on, and if the control terminal of the PMOS transistor is at the high level, the first terminal and the second terminal of the PMOS transistor are turned off. In a specific implementation, the gate of each of the above transistors is used as the control terminal, and according to the signal of the gate and the type of each of the transistors, the first terminal may be used as the source and the second terminal may be used as the drain, and alternatively, the first terminal may be used as the drain and the second terminal may be used as the source, which is not specifically limited herein. In addition, the ON-level and the OFF-level in the embodiments of the present application are generic references, the ON-level refers to any level capable of turning on the transistor, and the OFF-level refers to any level capable of turning off the transistor.

In the embodiments and drawings of the present application, the second transistor T2, the third transistor T3, the sixth transistor T6, the seventh transistor T7, the eighth transistor T8 and the ninth transistor T9 are only illustrated as PMOS transistors, but these transistors may be NMOS transistors, which is not limited in the present application. In addition, in the embodiments and the drawings of the present application, the fourth transistor T4 and the fifth transistor T5 are only illustrated as NMOS transistors, but these transistors may be PMOS transistors, which is not limited in the present application.

In some optional embodiments, referring to any one of FIGS. 1 and 10-15, a data writing period of the display panel includes a total of S frames of refresh images, and S>0. The data writing period may include a data writing frame and a holding frame, and the holding frame does not include the data writing stage. The frame is calculated based on a minimum period of one light emission stage, and the data writing module 12 provides the data signal Vdata to the driving transistor T1 in the data writing frame and does not provide the data signal Vdata to the driving transistor T1 in the holding frame.

The data writing frame may include the pre-light emission stage as described above, that is, the data writing frame may include the n1 bias stages as described above, and the holding frame may also include the bias stages, for example, the number of the bias stages in the holding frame may be n2, n2≥1, and n2 is an integer. As such, the bias adjustment is performed on the driving transistor in both of the data writing frame and the holding frame, so that there is little difference between the characteristics of the driving transistor in the data writing frame and the characteristics of the driving transistor in the holding frame, and the brightness difference between the data writing frame and the holding frame is reduced.

Exemplarily, the holding frame may include a non-light emission stage and a light emission stage. The non-light emission stage may include n2 bias stages.

In addition, in the non-light emission stage of the holding frame, all of the first initialization module 13, the compensation module 14 and the light-emitting control module 16 are turned off, and the second initialization module 15 may be optionally turned on. In the light emission stage of the holding frame, all of the first initialization module 13, the compensation module 14 and the second initialization module 15 are turned off, the light-emitting control module 16 is turned on, and the drive current generated by the driving transistor T1 is transmitted to the light-emitting element 20 which emits light.

In some optional embodiments, n1≥n2.

Figure 10:
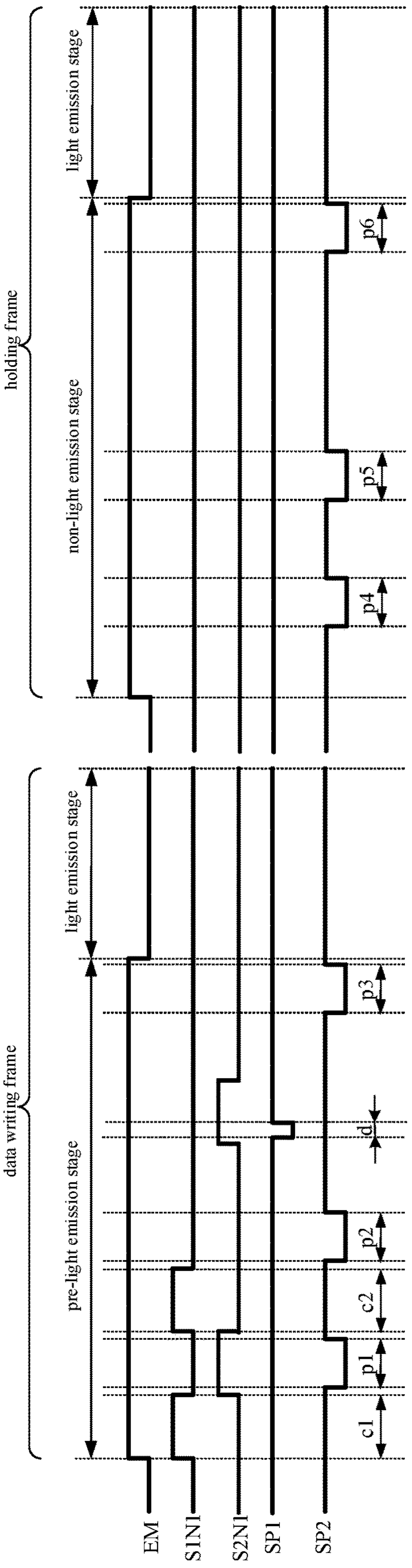
FIG. 10 shows yet another schematic diagram of a time sequence of the pixel circuit of FIG. 1.
Figure 11:
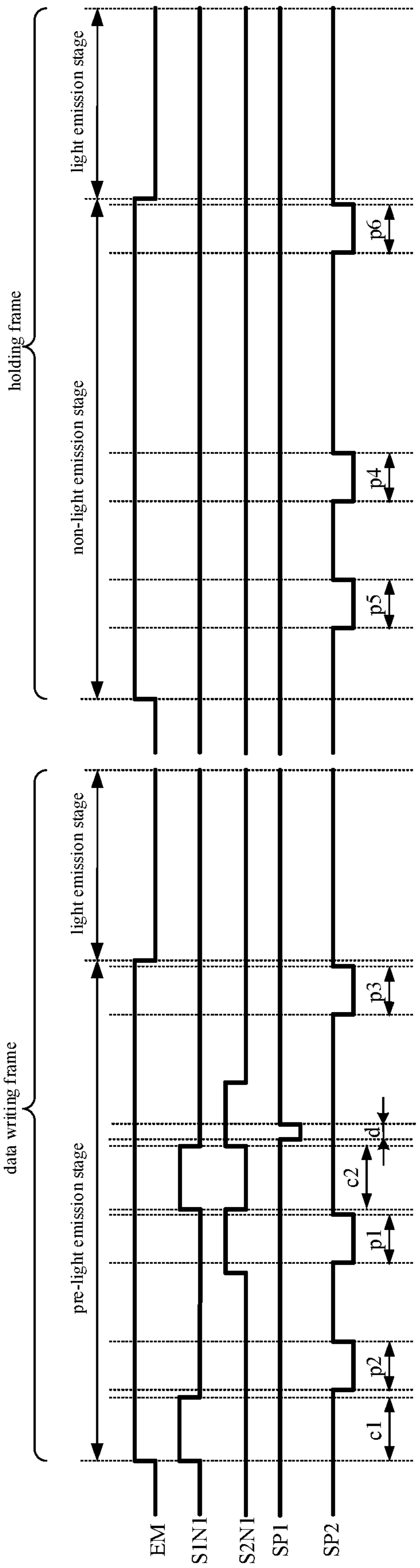
FIG. 11 shows yet another schematic diagram of a time sequence of the pixel circuit of FIG. 1.

As an example, as shown in FIG. 10 or FIG. 11, n1=n2=3. The three bias stages in the holding frame are the fourth bias stage p4, the fifth bias stage p5 and the sixth bias stage p6.

Figure 12:
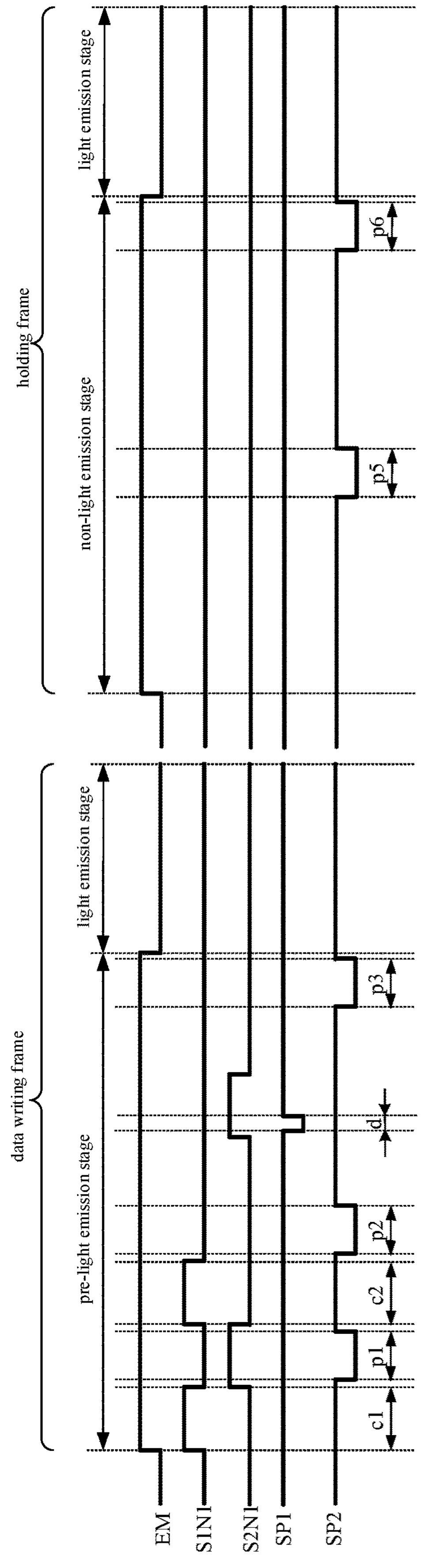
FIG. 12 shows yet another schematic diagram of a time sequence of the pixel circuit of FIG. 1.
Figure 13:
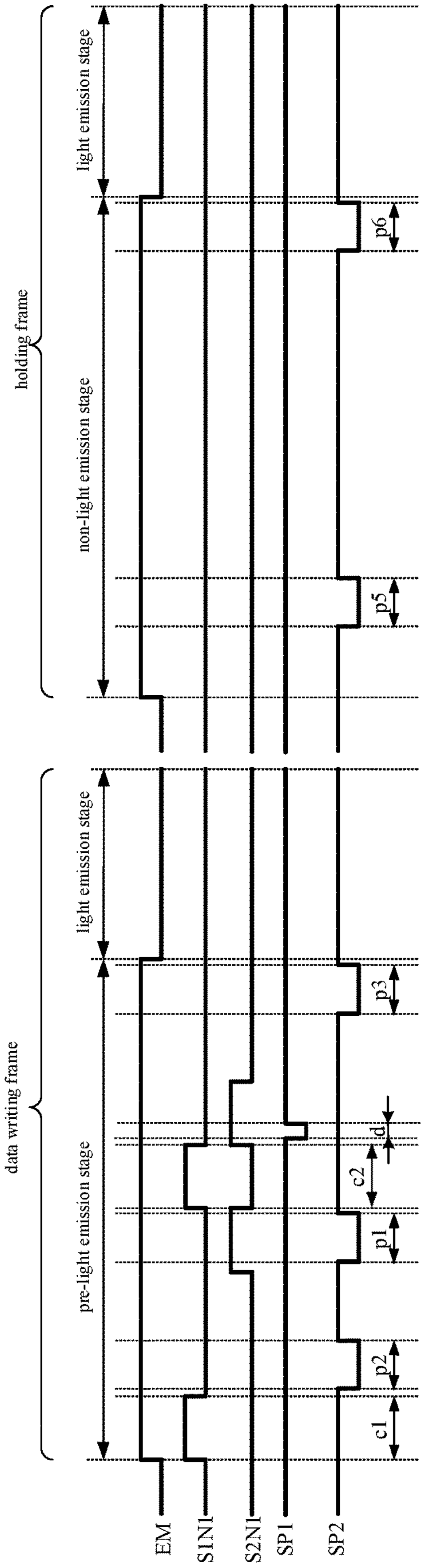
FIG. 13 shows yet another schematic diagram of a time sequence of the pixel circuit of FIG. 1.

As another example, as shown in FIG. 12 or FIG. 13, n1=n2=2. The two bias stages in the holding frame are the fifth bias stage p5 and the sixth bias stage p6.

Figure 14:
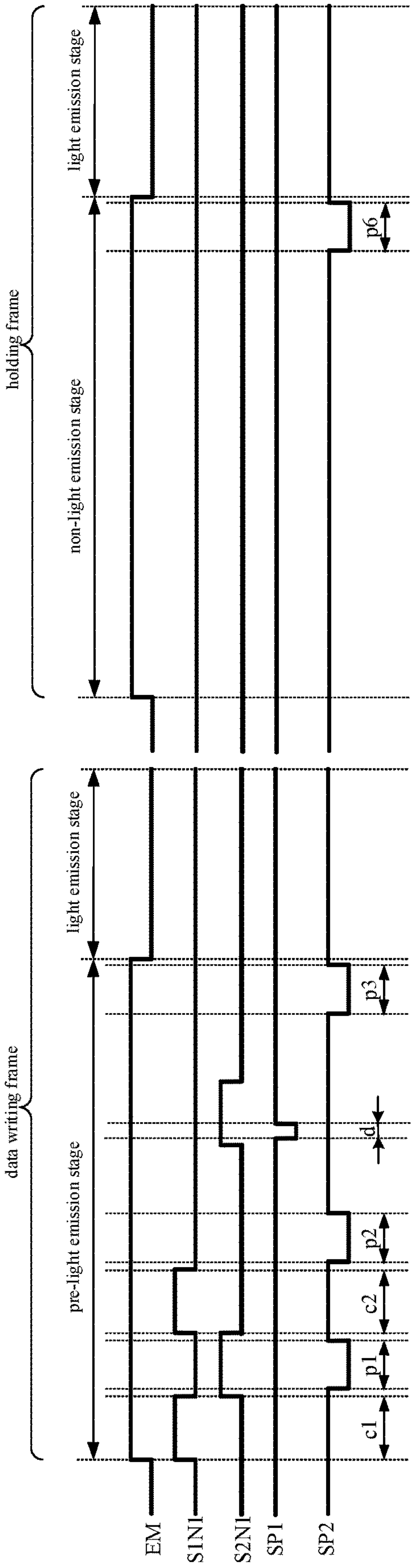
FIG. 14 shows yet another schematic diagram of a time sequence of the pixel circuit of FIG. 1.
Figure 15:
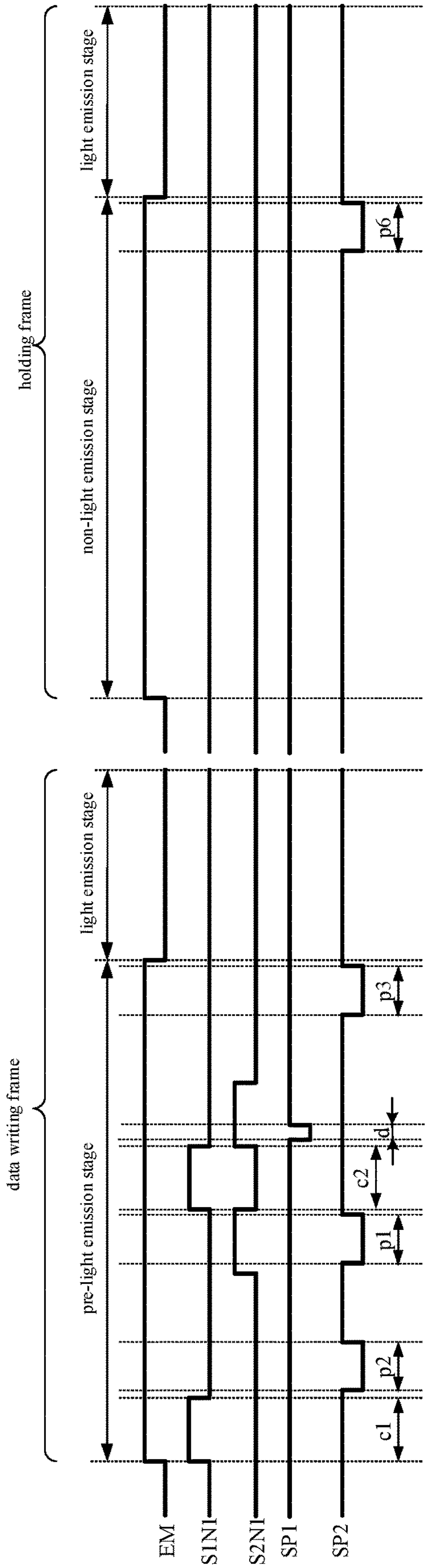
FIG. 15 shows yet another schematic diagram of a time sequence of the pixel circuit of FIG. 1.

As yet another example, as shown in FIG. 14 or FIG. 15, n1=n2=1. The one bias stage in the holding frame is the sixth bias stage p6.

A relative position of the fourth bias stage p4 in the holding frame may be equivalent to a relative position of the first bias stage p1 in the data writing frame, a relative position of the fifth bias stage p5 in the holding frame may be equivalent to a relative position of the second bias stage p2 in the data writing frame, and a relative position of the sixth bias stage p6 in the holding frame may be equivalent to a relative position of the third bias stage p3 in the data writing frame.

In some optional embodiments, a total duration of the n1 bias stages in the data writing frame is equal to a total duration of the n2 bias stages in the holding frame. As such, the difference between the characteristics of the driving transistor in the data writing frame and the characteristics of the driving transistor in the holding frame may be further reduced, and the brightness difference between the data writing frame and the holding frame is further reduced.

As an example, as shown in FIG. 10 or FIG. 11, n1=n2=3, the duration of the fourth bias stage p4 is equal to the duration of the first bias stage p1, the duration of the fifth bias stage p5 is equal to the duration of the second bias stage p2, and the duration of the sixth bias stage p6 is equal to the duration of the third bias stage p3.

Figure 16:
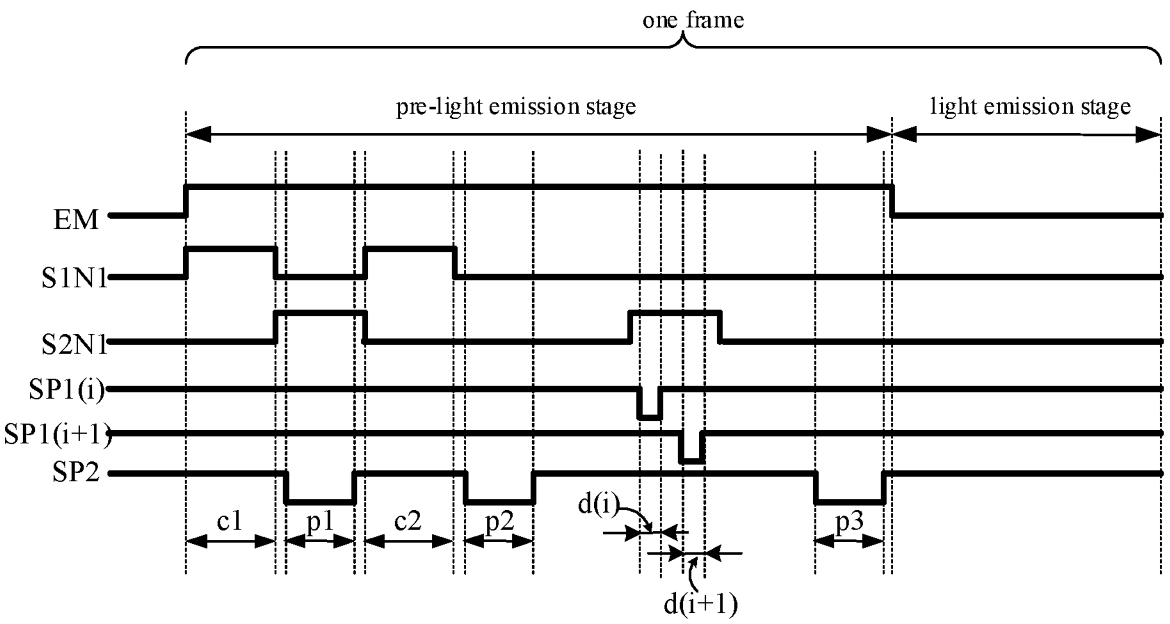
FIG. 16 shows yet another schematic diagram of a time sequence of the pixel circuit of FIG. 1.
Figure 17:
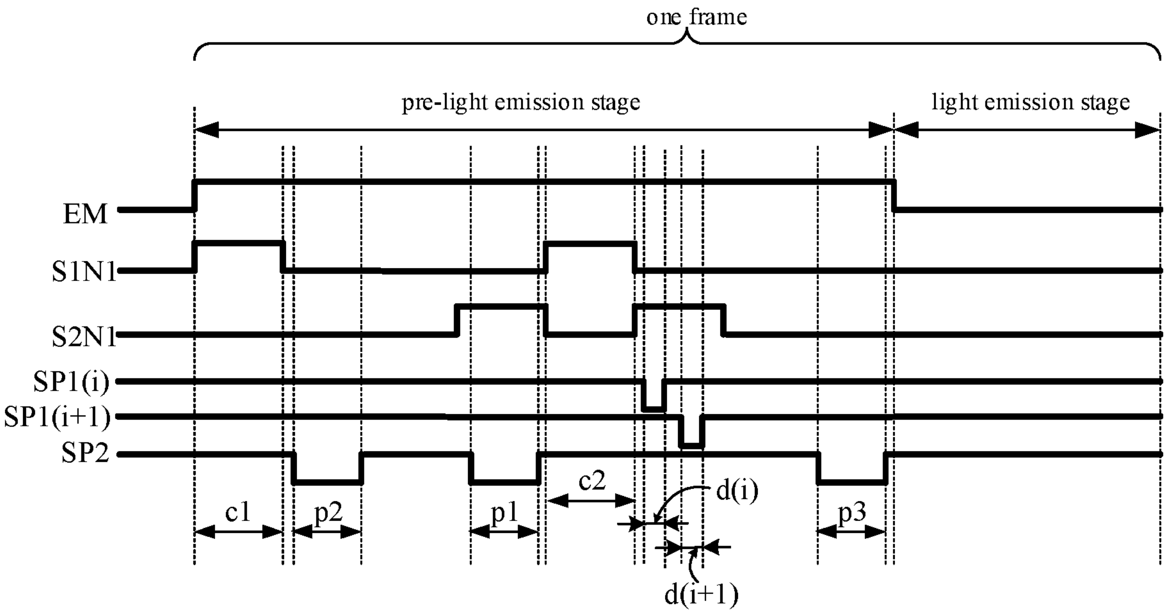
FIG. 17 shows yet another schematic diagram of a time sequence of the pixel circuit of FIG. 1.

In some optional embodiments, the display panel may include a plurality of rows of the pixel circuits. As shown in FIG. 1 and FIG. 16 or FIG. 17, under a condition that the data writing module 12 includes the first sub-module 121 and the second sub-module 122, the first control signal SP1 may drive a row of the pixel circuits, and other control signals except the first control signal SP1 may drive a plurality of rows of the pixel circuits.

For example, the second control signals SP2 received by at least n3 rows of the pixel circuits at a same moment may be identical, and in a duration of a same image frame, the n3 rows of the pixel circuits enter the data writing stage sequentially, n3≥2, and n3 is an integer.

The display panel may include a driving circuit, and the driving circuit may include a plurality of cascaded driving circuit units which may generate a control signal transmitted in cascade. The control signal is shared by the plurality of rows of the pixel circuits, and therefore the number of the driving circuit units may be reduced.

In FIG. 16 and FIG. 17, for example, n3=2, the second control signals SP2 received by the $i^{th}$ row and the $(i+1)^{th}$ row of the pixel circuits at a same moment may be identical, the third control signals S2N1 received by the $i^{th}$ row and the $(i+1)^{th}$ row of the pixel circuits at a same moment may be identical, the fourth control signals S1N1 received by the $i^{th}$ row and the $(i+1)^{th}$ row of the pixel circuits at a same moment may be identical, and the fifth control signals EM received by the $i^{th}$ row and the $(i+1)^{th}$ row of the pixel circuits at a same moment may be identical. The first control signals SP1(*i*) and SP1(*i*+1) received by the $i^{th}$ row and the $(i+1)^{th}$ row of the pixel circuits in a duration of a same image frame are ON-levels sequentially, so that the $i^{th}$ row and the $(i+1)^{th}$ row of the pixel circuits enter their corresponding data writing stages d(i) and d(i+1) sequentially.

Based on the same technical concept as the display panel provided by the above embodiments, the embodiments of the present application further provide a method for driving a display panel which may be applied to the display panel provided by the above embodiments.

As shown in FIG. 1, the display panel may include the light-emitting element 20 and the pixel circuit 10 including the driving module 11 and the data writing module 12. The driving module 11 is configured to provide a drive current for the light-emitting element 20 and includes the driving transistor T1. The light-emitting element 20 includes, but is not limited to, an organic light-emitting diode (OLED).

The data writing module 12 may provide the data signal Vdata and the bias signal DVH to the driving transistor T1.

As shown in FIG. 2 or FIG. 3, in a duration of an image frame of the display panel, the operation process of the pixel circuit may include the pre-light emission stage and the light emission stage. In a duration of at least one image frame, the pre-light emission stage of the pixel circuit may include the data writing stage d and the n1 bias stages, n1≥1, and n1 is an integer.

Figure 18:
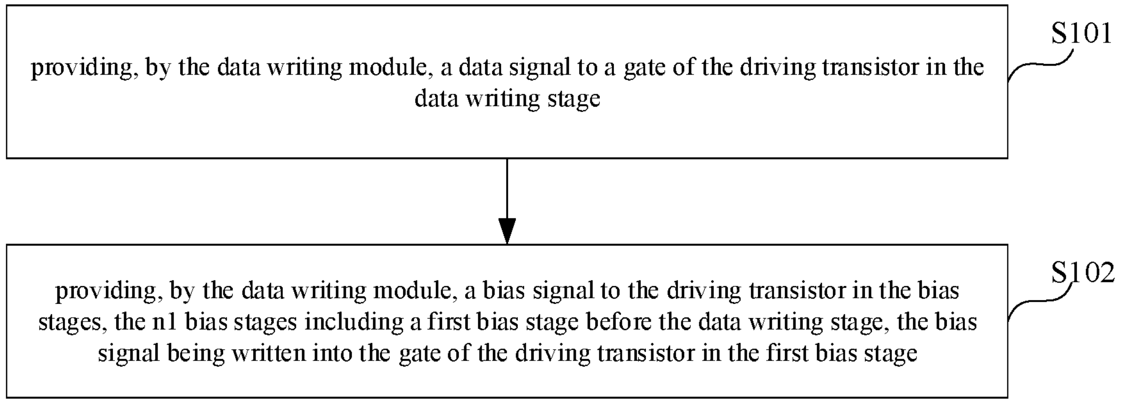
FIG. 18 shows a flow chart of a method for driving a display panel according to embodiments of the present application.

FIG. 18 shows a flow chart of a method for driving a display panel according to embodiments of the present application. As shown in FIG. 18, the method for driving the display panel includes steps S101 and S102.

Step S101: providing, by the data writing module, a data signal to a gate of the driving transistor in the data writing stage.

Step S102: providing, by the data writing module, a bias signal to the driving transistor in the bias stages, the n1 bias stages including a first bias stage before the data writing stage, the bias signal being written into the gate of the driving transistor in the first bias stage.

According to the method for driving the display panel provided by the embodiments of the present application, since the first bias stage is before the data writing stage, the writing of the bias signal into the gate of the driving transistor may modify the characteristics of the driving transistor in advance, and a unified writing of the bias signal is performed for the characteristics of the driving transistors of various pixel circuits before the data signal of the current image is written, so as to ensure that the characteristics of the driving transistors of various pixel circuits are more close before the data signal is written, and thus to eliminate the influence of bias voltage of a previous image on the driving transistors, mitigate the smear problem when the displayed image is switched and improve the display effect.

In some optional embodiments, as shown in any one of FIGS. 1 and 4-7, the pixel circuit 10 may further include the first initialization module 13.

Figure 19:
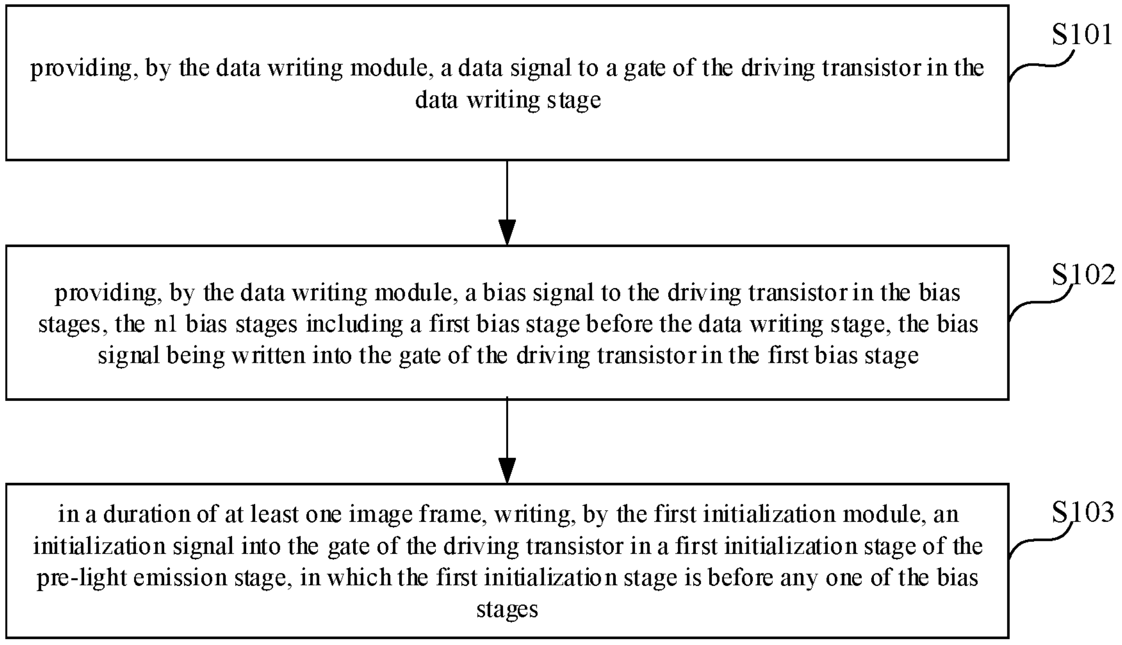
FIG. 19 shows another flow chart of a method for driving a display panel according to embodiments of the present application.

As shown in FIG. 19, the method for driving the display panel may further include step S103.

Step S103: in a duration of at least one image frame, writing, by the first initialization module, an initialization signal into the gate of the driving transistor in a first initialization stage of the pre-light emission stage, in which the first initialization stage is before any one of the bias stages.

Since the voltages of various driving transistors in a previous image frame may be different, for example, one of two light-emitting elements corresponds to a white image in the previous image frame and the other of the two light-emitting elements corresponds to a black image in the previous image frame, if there is no first initialization stage before the first bias stage, when the bias signal is written into the gates of two driving transistors corresponding to the two light-emitting elements, the potentials of the gates of the two driving transistor are different, which causes that the writing processes for the bias signal are different and therefore the bias voltage conditions of the two driving transistors are different, resulting in differences among different driving transistors. In the embodiments of the present application, the first initialization stage is before the first bias stage, thereby the bias signal may be written into the gates of the driving transistors after the gates of the driving transistors are initialized as a same potential, so that the various driving transistors are subject to a same writing process for the bias signal to further eliminate the influence of bias voltage of the previous image on the driving transistors.

Figure 20:
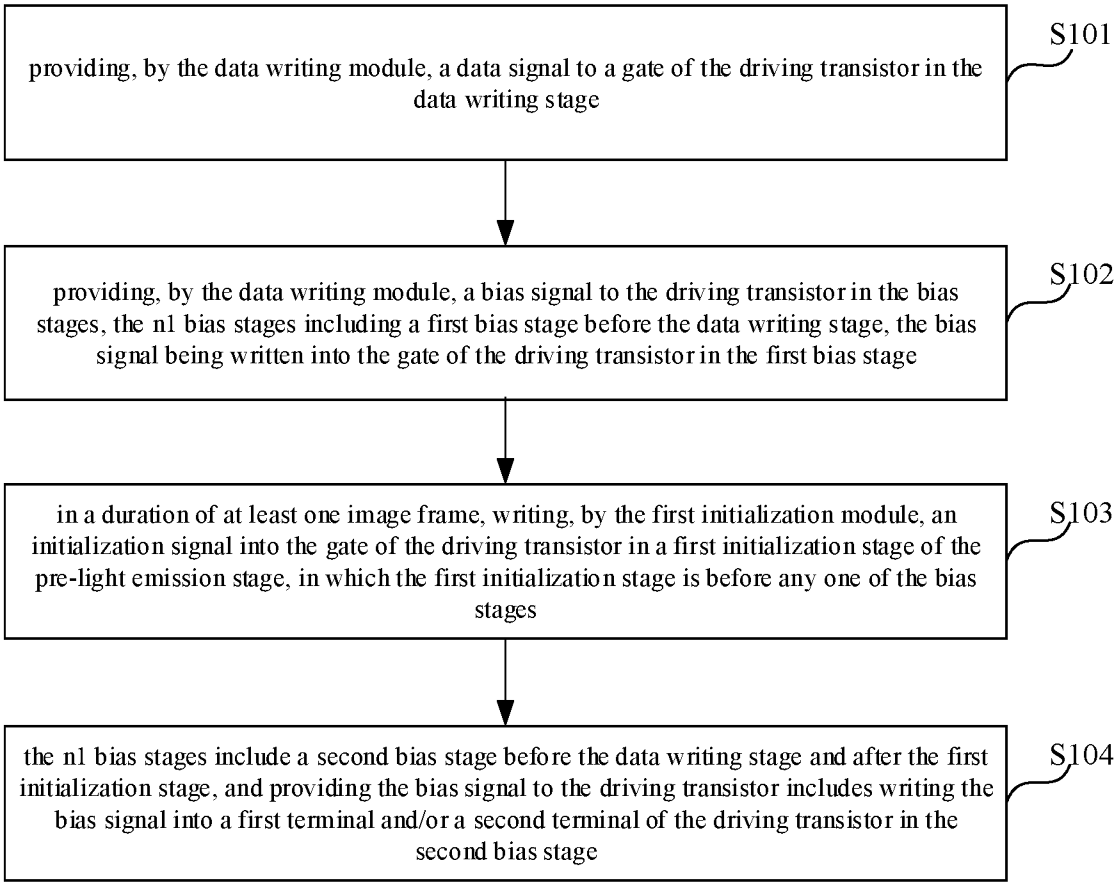
FIG. 20 shows yet another flow chart of a method for driving a display panel according to embodiments of the present application.

In some optional embodiments, n1≥2, and as shown in FIG. 20, the method for driving the display panel may further include step S104.

Step S104: the n1 bias stages include a second bias stage before the data writing stage and after the first initialization stage, and providing the bias signal to the driving transistor includes writing the bias signal into a first terminal and/or a second terminal of the driving transistor in the second bias stage.

In the embodiments of the present application, since the bias signal may be written into the first terminal and/or the second terminal of the driving transistor in the second bias stage, the driving transistor is in the OBS state to mitigate the potential difference between the gate of the driving transistor and the first terminal or the second terminal the driving transistor, reduce the polarization degree of the ions inside the driving transistor and adjust the threshold voltage Vth of the driving transistor, so as to further reduce the influence of bias voltage of the previous image on the driving transistor.

Figure 21:
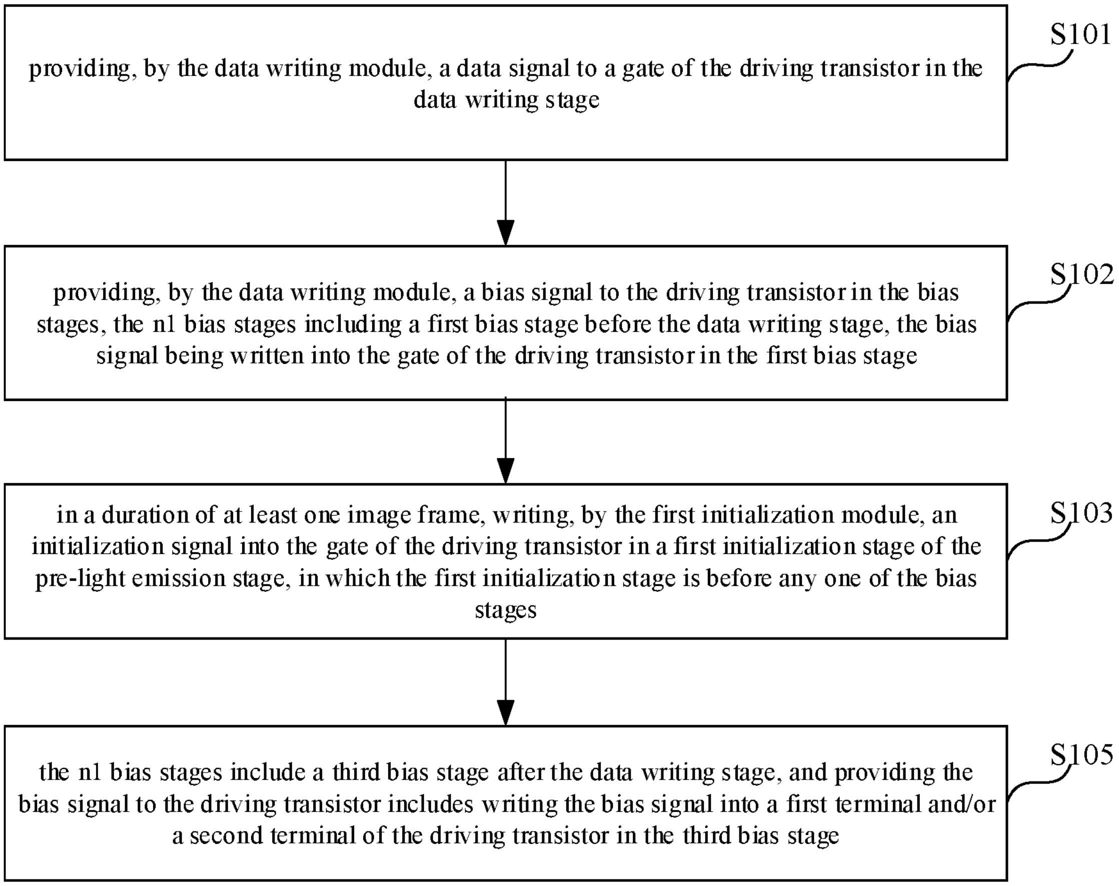
FIG. 21 shows yet another flow chart of a method for driving a display panel according to embodiments of the present application.

In some optional embodiments, n1≥3, and as shown in FIG. 21, the method for driving the display panel may further include step S105.

Step S105: the n1 bias stages include a third bias stage after the data writing stage, and providing the bias signal to the driving transistor includes writing the bias signal into a first terminal and/or a second terminal of the driving transistor in the third bias stage.

In the embodiments of the present application, with the third bias stage, the OBS process may be performed on the driving transistor again to reduce the influence of bias voltage of the previous image on the driving transistor.

Based on the same inventive concept, the embodiments of the present application further provide a display apparatus including the display panel according to the embodiments of the present application. Therefore, the display apparatus has the technical features of the display panel and the method for driving the display panel according to the embodiments of the present application, and can achieve the beneficial effects of the display panel according to the embodiments of the present application, and for common features, reference can be made to the above description of the display panel according to the embodiments of the present application, which are not be repeated herein.

Figure 22:
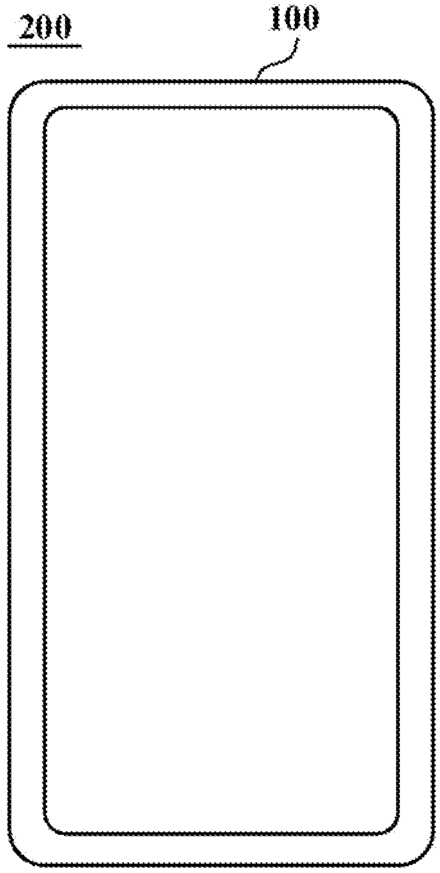
FIG. 22 shows a schematic structural diagram of a display apparatus according to embodiments of the present application.

Exemplarily, FIG. 22 shows a schematic structural diagram of a display apparatus according to embodiments of the present application. As shown in FIG. 22, the display apparatus 200 according to the embodiments of the present application includes the display panel 100 according to any one of the above embodiments of the present application. In the embodiments of FIG. 22, a mobile phone is given only as an example to illustrate the display apparatus 200, and it can be understood that the display apparatus 200 according to the embodiments of the present application may be any electronic product with display function, including but are not limited to: a mobile phone, a television, a notebook computer, a desktop display, a tablet computer, a digital camera, a smart bracelet, smart glasses, a vehicle-mounted display, a medical device, an industrial control device, a touch interaction terminal and the like, which is not limited herein.

According to the embodiments of present application as described above, these embodiments do not exhaustively describe all the details and do not limit the present application only to the specific embodiments. Obviously, many modifications and variations can be made according to the above description. These embodiments are selected and specifically described in the specification to better explain the principles and practical applications of the present application, so that a person skilled in the art is able to utilize the present application and make modifications based on the present application. The present application is limited only by the claims and the full scope and equivalents thereof.

What is claimed is:

1. A display panel, comprising:

a pixel circuit and a light-emitting element;

the pixel circuit comprising a data writing module and a driving module comprising a driving transistor;

in a duration of an image frame of the display panel, an operation process of the pixel circuit comprising a pre-light emission stage and a light emission stage;

in a duration of at least one image frame, the pre-light emission stage of the pixel circuit comprising a data writing stage and n1 bias stages, n1≥2, and n1 being an integer;

the data writing module being configured to provide a data signal to a gate of the driving transistor in the data writing stage and to provide a bias signal to the driving transistor in the bias stages; and the n1 bias stages comprising a first bias stage before the data writing stage, and the bias signal being written into the gate of the driving transistor in the first bias stage;

wherein the pixel circuit further comprises a first initialization module, and in a duration of at least one image frame, the pre-light emission stage of the pixel circuit further comprises a first initialization stage before any one of the bias stages; and the first initialization module is configured to write a first initialization signal into the gate of the driving transistor in the first initialization stage;

wherein the n1 bias stages comprise a second bias stage before the data writing stage and after the first initialization stage, and the bias signal is written into a first terminal and/or a second terminal of the driving transistor in the second bias stage.

2. The display panel according to claim 1, wherein the second bias stage is after the first bias stage.

3. The display panel according to claim 2, wherein in a duration of at least one image frame, the pre-light emission stage of the pixel circuit further comprises a second initialization stage between the first bias stage and the second bias stage; and the first initialization module is further configured to write the first initialization signal into the gate of the driving transistor in the second initialization stage.

4. The display panel according to claim 1, wherein the second bias stage is before the first bias stage.

5. The display panel according to claim 4, wherein in a duration of at least one image frame, the pre-light emission stage of the pixel circuit further comprises a second initialization stage between the first bias stage and the data writing stage; and the first initialization module is further configured to write the first initialization signal into the gate of the driving transistor in the second initialization stage.

6. The display panel according to claim 1, wherein n1≥3, the n1 bias stages comprise a third bias stage after the data writing stage, and the bias signal is written into the first terminal and/or the second terminal of the driving transistor in the third bias stage.

7. The display panel according to claim 6, wherein a duration of the first bias stage is greater than a duration of at least one of the second bias stage and the third bias stage.

8. The display panel according to claim 6, wherein a duration of the first bias stage is greater than or equal to a total duration of the second bias stage and the third bias stage.

9. The display panel according to claim 6, wherein a voltage of the bias signal in the first bias stage is V1, a voltage of the bias signal in the second bias stage is V2, and a voltage of the bias signal in the third bias stage is V3; and $$V1<V2 \text{ and/or } V1<V3.$$

10. The display panel according to claim 9, wherein V2=V3.

11. The display panel according to claim 1, wherein a data writing period of the display panel comprises a total of S frames of refresh images comprising a data writing frame and a holding frame, and S>0;

the data writing frame comprises the data writing stage, and the holding frame does not comprise the data writing stage; and the data writing frame comprises the n1 bias stages, the holding frame comprises n2 bias stages, n2≥1, and n2 is an integer.

12. The display panel according to claim 11, wherein n1≥n2.

13. The display panel according to claim 11, wherein a total duration of the n1 bias stages in the data writing frame is equal to a total duration of the n2 bias stages in the holding frame.

14. The display panel according to claim 1, wherein the data writing module comprises a first sub-module and a second sub-module;

the first sub-module is electrically connected to a data signal terminal and is configured to transmit, under control of a first control signal, the data signal provided by the data signal terminal; and the second sub-module is electrically connected to a bias signal terminal and is configured to transmit, under control of a second control signal, the bias signal provided by the bias signal terminal.

15. The display panel according to claim 14, wherein the display panel comprises a plurality of rows of the pixel circuits; and the second control signals received by at least n3 rows of the pixel circuits at a same moment are identical, and in a duration of a same image frame, the n3 rows of the pixel circuits enter the data writing stage sequentially, n3≥2, and n3 is an integer.

16. A method for driving a display panel, the display panel comprising a pixel circuit and a light-emitting element;

the pixel circuit comprising a data writing module and a driving module comprising a driving transistor;

in a duration of an image frame of the display panel, an operation process of the pixel circuit comprising a pre-light emission stage and a light emission stage, and in a duration of at least one image frame, the pre-light emission stage of the pixel circuit comprising a data writing stage and n1 bias stages, n1≥2, and n1 being an integer;

wherein the method comprises:

providing, by the data writing module, a data signal to a gate of the driving transistor in the data writing stage; and providing, by the data writing module, a bias signal to the driving transistor in the bias stages, the n1 bias stages comprising a first bias stage before the data writing stage, the bias signal being written into the gate of the driving transistor in the first bias stage;

wherein the pixel circuit further comprises a first initialization module, and the method further comprises:

in a duration of at least one image frame, writing, by the first initialization module, an initialization signal into the gate of the driving transistor in a first initialization stage of the pre-light emission stage, wherein the first initialization stage is before any one of the bias stages;

wherein the n1 bias stages comprise a second bias stage before the data writing stage and after the first initialization stage, and providing the bias signal to the driving transistor comprises writing the bias signal into a first terminal and/or a second terminal of the driving transistor in the second bias stage.

17. The method according to claim 16, wherein n1≥3, the n1 bias stages comprise a third bias stage after the data writing stage, and providing the bias signal to the driving transistor comprises writing the bias signal into a first terminal and/or a second terminal of the driving transistor in the third bias stage.

18. A display apparatus comprising a display panel, the display panel comprising:

a pixel circuit and a light-emitting element;

the pixel circuit comprising a data writing module and a driving module comprising a driving transistor;

in a duration of an image frame of the display panel, an operation process of the pixel circuit comprising a pre-light emission stage and a light emission stage;

in a duration of at least one image frame, the pre-light emission stage of the pixel circuit comprising a data writing stage and n1 bias stages, n1≥2, and n1 being an integer;

the data writing module being configured to provide a data signal to a gate of the driving transistor in the data writing stage and to provide a bias signal to the driving transistor in the bias stages; and the n1 bias stages comprising a first bias stage before the data writing stage, and the bias signal being written into the gate of the driving transistor in the first bias stage;

wherein the pixel circuit further comprises a first initialization module, and in a duration of at least one image frame, the pre-light emission stage of the pixel circuit further comprises a first initialization stage before any one of the bias stages; and the first initialization module is configured to write a first initialization signal into the gate of the driving transistor in the first initialization stage;

wherein the n1 bias stages comprise a second bias stage before the data writing stage and after the first initialization stage, and the bias signal is written into a first terminal and/or a second terminal of the driving transistor in the second bias stage.

* * * * *